(12) United States Patent
Albertsson

(10) Patent No.: US 7,912,790 B2
(45) Date of Patent: Mar. 22, 2011

(54) TOOL AND METHOD FOR PERSONNEL DEVELOPMENT AND TALENT MANAGEMENT BASED ON EXPERIENCE

(76) Inventor: Candice K. Albertsson, London (GB)

( * ) Notice: Subject to any disclaimer, the term of this patent is extended or adjusted under 35 U.S.C. 154(b) by 967 days.

(21) Appl. No.: 11/622,365

(22) Filed: Jan. 11, 2007

(65) Prior Publication Data

US 2007/0160964 A1 Jul. 12, 2007

Related U.S. Application Data

(60) Provisional application No. 60/758,436, filed on Jan. 12, 2006.

(51) Int. Cl.
*G06Q 10/00* (2006.01)
(52) U.S. Cl. .................................. 705/321; 705/320
(58) Field of Classification Search .................. 705/1.1, 705/320, 321
See application file for complete search history.

(56) References Cited

U.S. PATENT DOCUMENTS

| | | | |
|---|---|---|---|
| 7,233,971 B1 * | 6/2007 | Levy ............................. | 709/203 |
| 7,805,382 B2 * | 9/2010 | Rosen et al. ................... | 705/321 |
| 2004/0030566 A1 * | 2/2004 | Brooks Rix ..................... | 705/1 |
| 2007/0208575 A1 * | 9/2007 | Habichler et al. ................ | 705/1 |

OTHER PUBLICATIONS

Albertsson, C. K. "Best Practices in Leadership Development Handbook," chapter entitled "*BP Amoco*", forward by Warren Bennis, editors David Giber, Louis Carter and Marshall Goldsmith, pp. 166-187, publication by Jossey-Bass/Pfeiffer, San Francisco, 2000.
Albertsson, C. K., "Job Experiences Navigator," software tool developed for Shell Exploration & Production Company, implemented within Shell Exploration & Production Company in Sep. 2003.

\* cited by examiner

*Primary Examiner* — John G Weiss
*Assistant Examiner* — Amanda Kirlin
(74) *Attorney, Agent, or Firm* — Fay Sharpe LLP

(57) ABSTRACT

A computer implemented method for managing experience information includes: defining an overall blueprint representing a collection of experiences in a two-dimensional matrix having a plurality of entries organized into a plurality of rows and columns such that each entry in the matrix corresponds to one experience in the collection; defining a plurality of specific blueprints each modeled after the overall blueprint such that each specific blueprint represents the collection of experiences in the two-dimensional matrix and indicates a relative priority of each experience in the collection for the particular specific blueprint; obtaining experience information for a plurality of individuals using the overall blueprint, the experience information obtained for each individual defining a personal experience profile for that individual and indicating which experiences in the collection the individual possesses; and, storing the personal experience profile for each individual, each stored personal experience profile including the obtained experience information defining the personal experience profile for that individual.

52 Claims, 9 Drawing Sheets

OVERALL BLUEPRINT

| Navigation Pane | Content Pane |
|---|---|
| Main Menu<br>Homepage<br>Getting Started<br>Tutorial<br>FAQs<br>Log-in<br>Log-out<br><br>Blueprints<br>Overall Blueprint<br>Business Division Blueprints<br>Career Path Blueprints<br>Job Blueprints<br><br>Experience Profiles<br>Create Personal Profile<br>Update Personal Profile<br><br>Features<br>Compare Profile to Blueprint<br>Development Search<br>Talent Search<br>Succession Search<br>Succession Planning<br>Development Planning<br>Succession Management<br>Experience Overview<br>Job Priorities Overview | WELCOME |

FIGURE 2

OVERALL BLUEPRINT

SUCCESSION MANAGEMENT CHART

TOOL AND METHOD FOR PERSONNEL DEVELOPMENT AND TALENT MANAGEMENT BASED ON EXPERIENCE

The application claims the benefit of U.S. Provisional Application No. 60/758,436, filed Jan. 12, 2006, which is incorporated herein by reference in its entirety.

FIELD

The present inventive subject matter relates to the art of human resources development and/or management. Particular application is found in conjunction with a world wide web (WWW) or Internet based software tool, and the specification makes particular reference thereto. However, it is to be appreciated that aspects of the present inventive subject matter are also amenable to other like applications, various different networks and/or other embodiments.

BACKGROUND

Within a company, organization or other enterprise, a plurality of different individuals or personnel are typically employed or otherwise placed in various jobs or positions in order to effectively and efficiently conduct the business of the enterprise. For example, these jobs and/or positions may range from college entry level or starting positions to higher mid-level management or team leadership positions to even higher level executive or board member positions. Additionally, positions may vary in type across different business units or depending on the different objectives of different divisions within the enterprise. For example, positions may vary from sales positions to technical or research and development positions to marketing positions to manufacturing positions to support positions, etc.

It is also usually in the interest of the enterprise and the personnel to meaningfully pair individuals with appropriate positions. That is to say, both the enterprise and the personnel typically benefit when individuals are placed in positions for which they are best qualified and/or in which they are most likely to succeed. Accordingly, an enterprise will often seek to maximize the effectiveness and/or efficiency of its business or other operations by utilizing its personnel so that individuals are placed in positions to which they are best suited, respectively, thereby advantageously exploiting or leveraging their collective and/or individual experience and potential to the greatest extent possible.

Generally, job and/or other related experiences are widely acknowledged as important and/or valuable determining factors to be considered in assessing an individual's qualifications, suitability and/or preparedness for a particular position. An individual's prior experience is commonly a significant indicator of that individual's ability to successfully perform the duties of and/or otherwise flourish in a given position. Notwithstanding its acknowledged importance and/or value, the vast majority of enterprises are not equipped to effectively capture and/or utilize experience information, nor integrate this experience information into various personnel development and/or talent management processes. Although experience has a significant role to play, it is often handled superficially because there is no established approach or framework for capturing and integrating high quality experience information into these processes.

Additionally, individuals in positions at particular levels within an enterprise will often have aspirations or otherwise desire to advance over time to higher levels or otherwise follow particular career paths within the enterprise. Likewise, the enterprise typically enjoys a mutual benefit by advancing its personnel to higher level positions and/or along particular career paths when warranted. That is to say, so as to not be underutilizing or wasting their talent pool, an enterprise will often seek to promote or transfer high performing and/or high potential personnel to higher levels (or perhaps lateral development positions to prepare them for higher level positions). In short, the enterprise often wants to encourage and/or promote the development of their personnel along certain career paths and/or to advance individuals to higher positions. Moreover, if the enterprise anticipates a shortfall of qualified personnel for a given position in the future, they may desire to start grooming one or more individuals for that position in advance so as to be prepared to fill the position when the time comes.

Again, it is widely recognized that the job or job related experiences of personnel has a significant influence on successful career planning and/or development. That is to say, the development of personnel along particular career paths best suited to the particular individuals and/or the successful advancement of individuals to higher positions is meaningfully impacted by the growth and/or evolution of each individual's job experiences. However, heretofore there has been lacking a suitable tool, framework or method to effectively and/or efficiently capture and/or utilize high quality experience information in career planning, development, succession planning and/or talent management applications. Consequently, the vast majority of enterprises have handled experience information superficially and as a result, the quality and/or effectiveness of career planning, development, succession planning and talent management has suffered. More effective capturing, handling and/or use of experience information is the missing component that would strengthen existing career planning, development, succession planning and talent management processes significantly beyond their current contribution.

Consistent with the traditional superficial handling of experience related information, most organizations have been typically unable to provide much clarity on development to their employees, neither in the case of more immediate or short term goals (i.e., 'next steps') nor in the case of longer term goals and/or subsequent steps. This can be a significant issue in organizations. For example, employees may often feel bewildered and lost when it comes to getting proper development guidance in an organization. Likewise, coaches and line managers often scramble to find a couple suggestions or ideas for development when meeting with an employee who is seeking development advice. The anecdotal advice commonly provided is typically: lower quality; inconsistent (e.g., across different people providing the advice); has a shorter-term focus (i.e., what is next, rather than what are the 4-5 key experiences that are most helpful or useful over the next five to seven years and what are the best steps to achieve that development); and is typically based on what was deemed important in the past, rather than the development that may be deemed important in the future.

Development done properly addresses shorter term goals and/or more immediate next steps as well as having a longer term perspective (i.e., the next steps should be selected so as to be building in the direction of the longer term development goals to achieve the individual's longer term aspirations). It should be appreciated that next steps may mean progression for some users and lateral development at the current level for other users. In either case, an individual's development typically benefits from having the proper mix and timing of various experiences. That is to say, building the right foundation of experience to maximize the opportunity for future development ensures that an individual does not derail solely because they missed a key foundational experience (that may otherwise no longer be available to them because they are too senior or have the wrong experience background). However, in many instance, enterprises relying on superficial and/or anecdotal experience information and/or lacking a suitable common framework and/or approach for managing and/or understanding experience information, often cannot reliably provide suitable development guidance to individuals, e.g., resulting in a weak or inadequate foundation and mix of experiences which has the potential of stalling an individual's career longer term.

Most employees do not appreciate the range of experiences within an organization, nor do they appreciate the priority of those experiences. Absent a suitable solution, it is very difficult to understand the range of higher priority experiences that are deemed important to be successful within an organization. Without this understanding, it is very difficult for people to successfully manage the development of their careers. Without high quality career development, an organization will often encounter considerable difficulty in attempting to maximize the development of their people and therefore, may not succeed in maximizing organizational performance and/or the financial bottom-line. Few organizations, if any, have a proper 'development roadmap' that provides high quality development advice which is relevant to the specific organization (and even more specifically, relevant to the job one may be seeking in any given case), while also taking into account the person's past experiences. Generally, an enterprise is not equipped to provide high quality shorter and longer term guidance to employees, coaches and line managers. Moreover, enterprises typically do not have a common framework that enables employee, coach and line manager to communicate and utilize a common development language that is relevant and specific to the organization.

Accordingly, a new tool and/or method for assisting talent management and/or personnel development based upon an individual's job related experiences is disclosed that overcomes the above-referenced problems and others.

SUMMARY

In accordance with one embodiment, a computer implemented method for managing experience information is provided. The method includes: defining an overall blueprint representing a collection of experiences in a two-dimensional matrix having a plurality of entries organized into a plurality of rows and columns such that each entry in the matrix corresponds to one experience in the collection; defining a plurality of specific blueprints each modeled after the overall blueprint such that each specific blueprint represents the collection of experiences in the two-dimensional matrix and indicates a relative priority of each experience in the collection for the particular specific blueprint; obtaining experience information for a plurality of individuals using the overall blueprint, the experience information obtained for each individual defining an experience profile for that individual and indicating which experiences in the collection the individual possesses; and, storing the personal experience profile for each individual, each stored personal experience profile including the obtained experience information defining the personal experience profile for that individual.

In accordance with another embodiment, a software tool for managing experience information includes: an overall blueprint representing a collection of experiences in a two-dimensional matrix having a plurality of entries organized into a plurality of rows and columns such that each entry in the matrix corresponds to one experience in the collection; a plurality of specific blueprints each modeled after the overall blueprint such that each specific blueprint represents the collection of experiences in the two-dimensional matrix and indicates a relative priority of each experience in the collection for the particular specific blueprint; an interface for obtaining experience information for a plurality of individuals using the overall blueprint, the experience information obtained for each individual defining an experience profile for that individual and indicating which experiences in the collection the individual possesses; and, a database for storing the personal experience profile for each individual, each stored personal experience profile including the obtained experience information defining the personal experience profile for that individual.

In accordance with another embodiment, a computer implemented method of managing experience information within an enterprise is provided. The method includes: defining at least one job blueprint representing a collection of experiences in a two-dimensional matrix having a plurality of entries organized into a plurality of rows and columns such that each entry in the matrix corresponds to one experience in the collection, the job blueprint corresponding to a particular position within the enterprise and indicating a relative priority of each experience in the collection for that position; obtaining experience information for a plurality of individuals within the enterprise, the experience information obtained for each individual defining a personal experience profile for that individual and indicating which experiences in the collection the individual possesses; comparing the personal experience profiles to the job blueprint; and, generating a succession plan based upon the comparison, wherein the succession plan includes a list of individuals having personal experience profiles that match the job blueprint within some degree of tolerance.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

FIG. 2 illustrates a window or screen shot of an exemplary homepage or welcome screen employed by the tool of FIG. 1.

DETAILED DESCRIPTION OF PREFERRED EMBODIMENT(S)

For clarity and simplicity, the present specification shall refer to structural and/or functional elements, entities and/or facilities, relevant standards, protocols and/or services, and other components that are commonly known in the art without further detailed explanation as to their configuration or operation except to the extent they have been modified or altered in accordance with and/or to accommodate the exemplary embodiment(s) presented herein.

Figure 1:
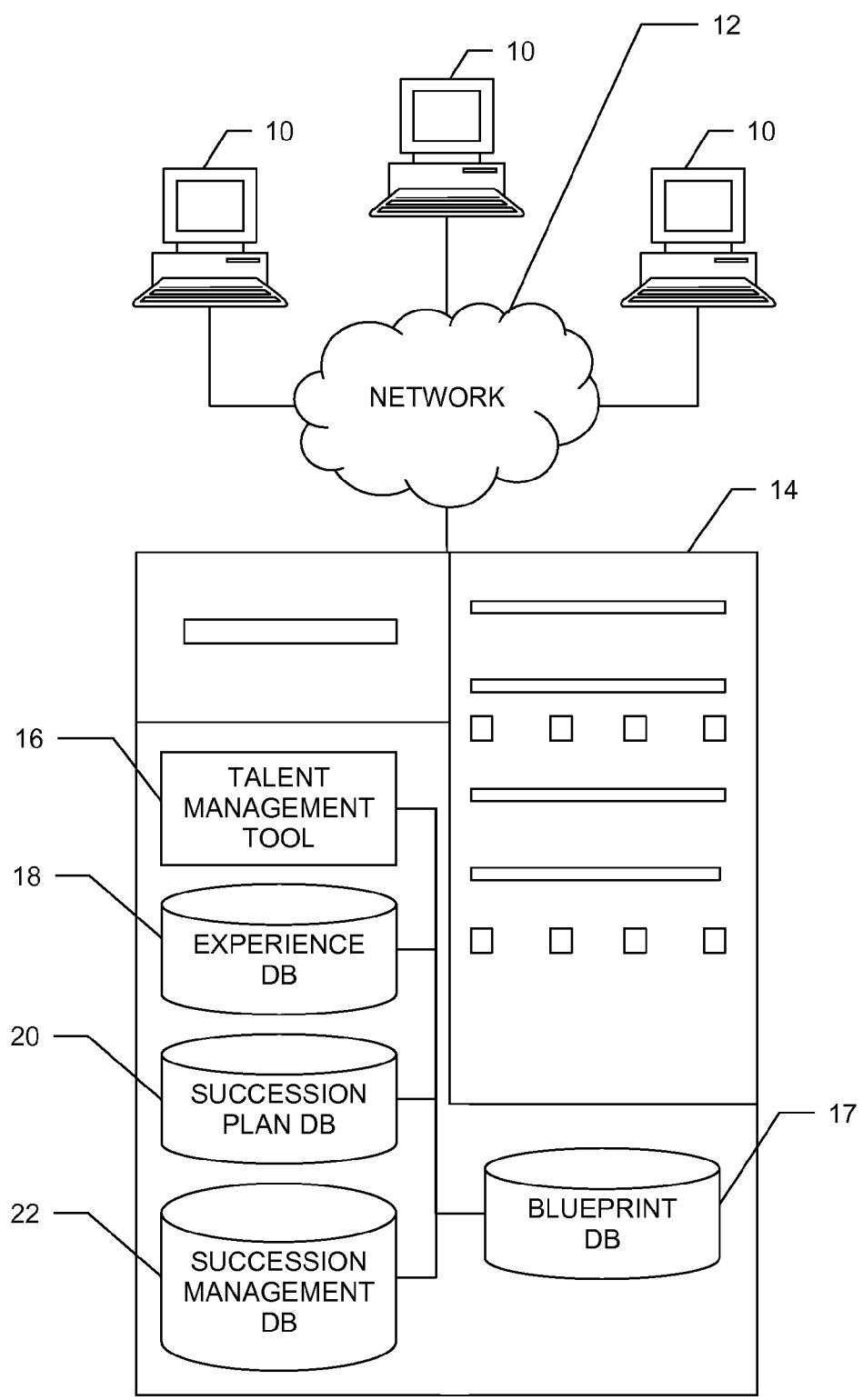
FIG. 1 is diagrammatic illustration of a suitable network environment supporting an exemplary embodiment of a personnel development and/or talent management tool embodying aspects of the present inventive subject matter.

With reference to FIG. 1, there is shown a plurality of workstations 10 operatively connected in the usual manner via a network 12 to a web, application, database and/or other suitable type of server 14 that provides individual workstations 10 access to a personnel development and/or talent management application or tool 16 supported by and/or on the server 14. Suitably, the tool 16 is implemented as one or more optionally customizable software programs or another appropriate collection of instructions running on and/or being executed by the server 14 to perform and/or administer the tasks, processes and/or functions associated with the tool 16 as they are described herein. While FIG. 1 shows the tool 16 being associated with and/or provisioned or equipped on a server and accessed via a network, optionally, the tool 16 may be associated with and/or provisioned or equipped directly on one or more individual workstations. Moreover, while only a single server 14 is illustrated as implementing, administering and/or supporting the tool 16, it is to be appreciated that optionally one or more servers may act separately or in combination to function as web servers, application servers, database servers, etc., such that collectively they operate in conjunction with one another to implement, administer and/or support the tool 16.

In general, the tool 16 is deployed and/or utilized by a company, organization or other enterprise to aid, assist and/or provide guidance for personnel development, talent management and/or other similar or related operations or tasks. Suitably, in one mode of operation, the tool 16 is used by the enterprise and/or its personnel to efficiently and effectively capture and/or update high quality job or job related experience information for various individuals, such as the current personnel of the enterprise or optionally potential new candidates for employment or placement within the enterprise. Suitably, the enterprise deploying and/or utilizing the tool 16 employs or otherwise places a plurality of different individuals or personnel in various jobs or positions within the enterprise in order to effectively and efficiently conduct the business or operations of the enterprise. For example, these positions may range from entry level or starting positions to higher mid-level management or team leadership positions to even higher level executive or board member positions. Additionally, positions may vary in type across different business units or depending on the different objectives of different divisions within the enterprise. For example, positions may vary from sales positions to technical or research and development positions to marketing positions to manufacturing positions to support positions, etc.

Optionally, the experience information captured or otherwise obtained for each individual using the tool 16 is contained or reflected in a personal experience profile associated with that individual. Suitably, these profiles are stored, reside and/or are otherwise maintained in an electronic, optical, magnetic or other readable and/or recordable format accessible by the server 14 and/or the tool 16. For example, as shown in FIG. 1, the profiles are optionally maintained as records in an experience database (DB) 18 that is included or supported on the server 14 and/or that is otherwise accessible by the server 14 and/or the tool 16. Suitably, the DB 18 and an associated database management system (DBMS) is supported on a separate database server operatively connected to and/or accessible by the server 14 and/or the tool 16, or the server 14 itself acts as the database server including the DBMS.

In a suitable embodiment, the network 12 optionally comprises a public data network such as the Internet; a wide area network (WAN); a private data network such as an intranet; or a local area network (LAN) or a virtual private network (VPN) of the enterprise deploying and/or utilizing the tool 16; or some combination of the foregoing. The workstations 10 optionally comprise computers, access terminals or other suitable client devices that are optionally equipped, programmed or otherwise provisioned with a web, Internet or other appropriate browser or similar software running thereon that is used to access, retrieve, navigate and/or interact with information, data, webpages and/or other content provided over the network 12 by the server 14 to the workstations 10 in accordance with the operation of the tool 16. Suitably, each workstation 10 also includes a graphical user interface (GUI) or another appropriate interface on which is displayed or otherwise output the information, data, webpages and/or other content received by the workstation 10 from the server 14 over the network 12. The GUI also provides a user of the workstation 10 with the ability to input requests, instructions, selections, data, information, commands, search queries and the like that are transmitted or routed over the network 12 to the server 14 for selectively operating the tool 16, as well as for interacting with the displayed data, information and/or other content, navigating to and/or from various webpages or locations, etc.

Optionally, the tool 16 is suitably operated via a menu driven interface provided to the user, e.g., in form of webpages provided by the server 14 over the network 12 to the workstation 10 being employed by the user. Using hyperlinks or other objects and/or data fields contained in and/or on the respective webpages, windows or screens displayed or output, the user appropriately manipulates the GUI and/or the browser of the workstation 10 to provide the tool 16 with input data and/or to direct operation of the tool 16 to perform desired tasks, processes and/or functions. In response, the tool 16 returns and/or outputs the appropriate data, information and/or content, e.g., in the form of a webpage or the like sent by the server 14 over the network 12 to the workstation 10.

In a suitable embodiment, when a user employs one of the workstations 10 to access the tool 16 or otherwise navigate to the website on which the tool 16 resides, the workstation 10 is initially provided a homepage from the server 14 over the network 12, or the workstation 10 otherwise obtains and displays an introductory or welcome screen, e.g., such as the one shown in FIG. 2. As shown, the homepage or welcome screen includes links and/or objects in a navigation pane that when selected by the user retrieves into a content pane various information (in the form of webpages or otherwise) and/or initiate various tasks supported by the tool 16. For example, links such as the "Getting Started" link, the "Tutorial" link and the "FAQs" link (i.e., frequently asked questions) are optionally provided to guide a user to navigate to webpages or otherwise retrieve information relating to the background, objectives, purpose, use and/or operation of the tool 16.

More substantively, the tool 16 provides a number of related tasks and/or functions that effectively capture, update and/or utilize the experience information maintained in the DB 18 to guide or otherwise aid in personnel development and/or talent management. Suitably, various personnel or individuals of the company, organization or other like enterprise are granted selective access to various functionalities within the tool 16 through the server 14 using the workstations 10 to carry out one or more talent development/management related tasks or functions administer by the tool 16. For example, these tasks optionally include: entering and/or updating job experiences for enterprise personnel; assessing an individual's qualifications and/or fitness for a particular position or career path within the enterprise; and, searching the collection of personal experience profiles and/or specific blueprints, e.g., to identify candidates for a particular position or career path within the enterprise. Suitably, certain tasks are optionally reserved for higher level users (e.g., human resources personnel, managers and/or executives) that coordinate or are otherwise involved in various talent management processes such as succession planning, job placement, etc. Other tasks, however, are optionally made available to more general users or all personnel. That is to say, the general personnel are optionally provided the opportunity to access the tool 16 and create, view and/or update their own personal experience profile, as well as comparing their own personal experience profile against various specific blueprints. Optionally, a general user may also have access to view another individual's personal experience profile subject to access being granted by the other individual. Suitably, the various task are selected using a menu driven selection process or the like. For example, a particular task is initiated as desired by selecting an associated link or other like object on the homepage, in the navigation pane or other like menu which is provided by the server 14 for display on the workstation 10 when the tool 16 is accessed.

For security purposes, an individual attempting to use the tool 16 is optionally requested to "log-in" prior to being provided the homepage or access to the tool 16. For example, an individual or user may have to be registered or otherwise have log-in credentials established for them prior to obtaining access to or using the tool 16. Suitably, the log-in credentials include a user name (e.g., which may be a user's e-mail address or another unique identifier) and password, however, any appropriate identity authenticating credentials may be employed. For example, at a log-in webpage provided to the workstation 10 by the server 14 over the network 12 or at another similar log-in screen displayed on the workstation 10, the user enters their authentication credentials, e.g., using the GUI and/or browser supported on the workstation 10. Suitably, the log-in webpage or screen precedes presentation of the homepage and would restrict all access and/or use of the tool 16 without the proper log-in credentials. Alternately, the log-in webpage or screen is optionally accessible from the homepage via a "Log-in" link or other like object that is selected from the navigation pane of the window for the purpose of logging-in. In the latter case, a user accessing the tool 16 or the website on which the tool 16 is located would be restricted from navigating to selected areas of the website or using selected functions of the tool 16 until after they have logged-in. Optionally however, some areas and/or functions, e.g., such as informational areas (i.e., background info., FAQs, tutorials), demonstration functions, etc., may be made available to users that have not yet been logged-in.

Suitably, the tool 16 or another authentication entity or function checks the entered credentials against previously established credential on record (e.g., maintained in the DB 18 along with the users' experience profiles) to identify the individual and/or determine if they are an authorized user. For example, if when logging-in the entered user name is recognized and the password entered is also correct, then the user is granted access to the tool 16, otherwise if the user name is not recognized or the password does not match, then the user is denied access to the tool 16.

Additionally, depending on a clearance level of the user accessing the tool 16, the user's privileges to access various personal experience profiles and/or employ various features of the tool 16 may be restricted. For example, general personnel are restricted to accessing only their own personal experience profile (unless another individual has specifically authorized a general personnel user access to their personal experience profile). However, human resources or talent management personnel or managers or other high level personnel within the enterprise may optionally be granted permission to access the personal experience profiles of other individuals. Similarly, certain designated personnel may be provided access to some features of the tool 16 while others are not. For example, human resources personnel or hiring committee members may be granted access to a feature that allows them to search the personal experience profiles in the DB 18 for potential candidates that meet selected criteria for a particular position based upon the candidates' personal experience profiles, while general personnel may not have access to this feature.

Figure 3:
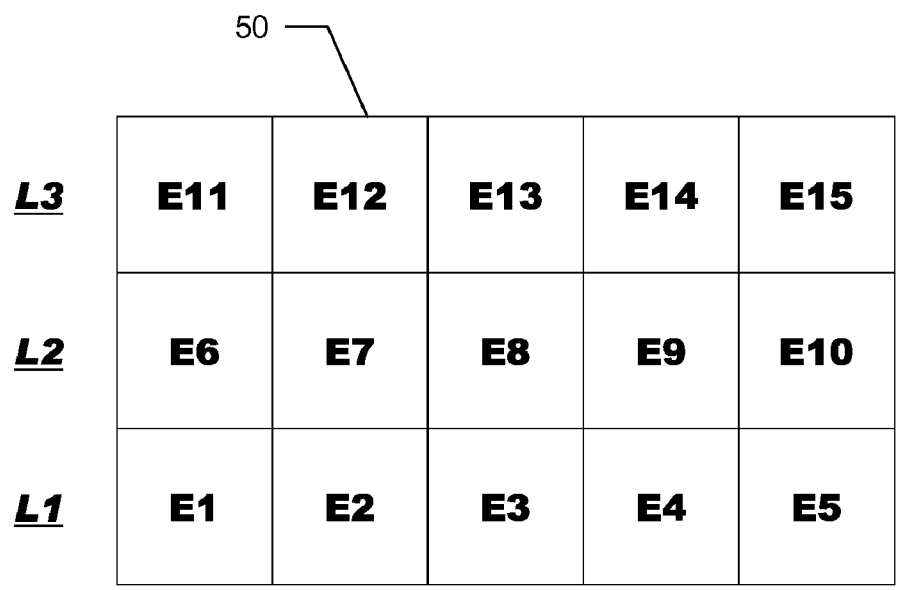
FIG. 3 is a graphical representation of an exemplary overall blueprint utilized by the tool of FIG. 1.

In an exemplary embodiment, the tool 16 is optionally customizable for the particular enterprise deploying and/or using it. FIG. 3 shows an exemplary overall blueprint 50 for a particular exemplary enterprise. The overall blueprint 50 is a graphical representation of a collection of job and/or job related experiences. As shown the overall blueprint 50 in FIG. 3 is arranged as a two-dimensional (2D) matrix of job related experiences grouped into rows representing position levels, pay scale levels, career levels, grade levels, band or organization levels within the enterprise where the corresponding experiences are most likely to be encountered and/or realized. In the illustrated example, 15 different experiences (i.e., E1 through E15) are defined and grouped into three different grade levels (i.e., L1, L2 and L3). While simply labeled for purposes of illustration herein, in practice, the various experiences and/or levels are suitably labeled with appropriate and/or meaningful descriptive titles, e.g., specific to the enterprise.

In practice, the overall blueprint 50 is developed by the enterprise employing the tool 16 or alternately by a suitable proxy. For example, a suitable proxy such as an external consultant identifies the experiences to include through a series of internal interviews with enterprise personnel and/or via other methodologies. Thereafter, the outcome is optionally reviewed with an internal project team and/or executive committee to agree upon and finalize experiences. That is to say, it is determined which experiences to include in the overall blueprint or matrix, what grades, bands or organization levels are to be included in the overall blueprint or matrix, which grade, band or organization level each experience is to be grouped in, and how each experience is to be titled, defined and/or described. Typically, these determinations are made to reflect the particular structure and/or business of the enterprise, the positions within the enterprise, the particular business strategy of the enterprise and the experiences valued by the enterprise (i.e., the experiences that the enterprise has identified and/or defined as being indicative of or significantly impacting an individual's qualification or suitability for one or more positions or career paths within the enterprise). Suitably, the overall blueprint 50 includes all the experiences that are deemed important to and/or impactful on any of the positions, career paths, etc., within the enterprise as a whole or on the achievement of the business strategy or the business of the enterprise. That is to say, the overall blueprint 50 includes all the experiences that will have some material non-zero weight in at least one specific blueprint built from or based on the overall blueprint 50.

The overall blueprint 50 serves as the basic template upon which experience profiles and other specific blueprints are defined and/or built. For example, specific blueprints are optionally defined for various jobs or positions within the enterprise, for various career paths within the enterprise, for different divisions or business units within the enterprise, etc. A specific blueprint is a graphical representation of the collection of experiences outlined by the overall blueprint 50, but which further weights (e.g., non-uniformly) the relevance and/or importance of the experiences based upon the particular job, position, career path, division or business unit or the like to which the specific blueprint relates. For example, one given experience may be particularly valuable for one position, while that same experience is relatively unimportant for a different position. Accordingly, the specific blueprint for the first position would weight the given experience highly, while the specific blueprint for the second position would give relatively little weight to the given experience.

Figure 4:
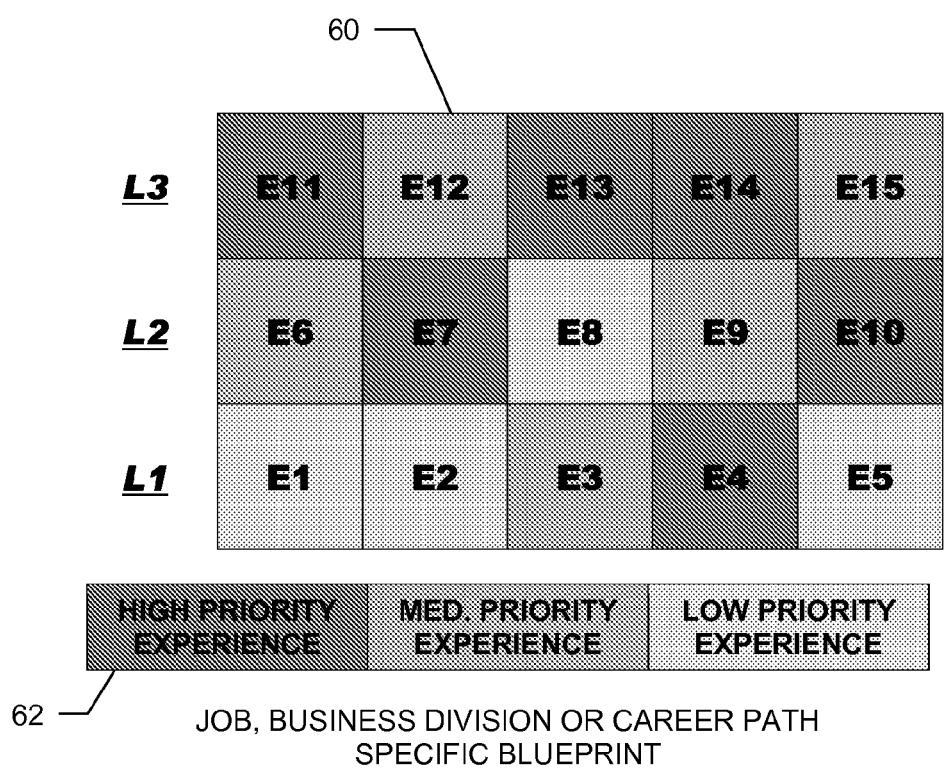
FIG. 4 is a graphical representation of an exemplary specific blueprint utilized by the tool of FIG. 1.

With reference to FIG. 4, there is illustrated an exemplary specific blueprint 60 which has been defined and/or built using the overall blueprint 50 as a template, i.e., having the same grade, band or organization levels and experiences in the same locations relative to one another. However, the various experiences have been assigned or attributed a relative weight, rank or priority. In the current example, three priority levels, namely, high, medium and low, have been used, however, in practice there may be any number of relative priority levels including a designation of "none" or no priority, i.e., a zero weight. As can be appreciated, the specific blueprint 60 for each one of the different jobs, positions, career paths, business divisions, etc., weights or prioritizes each experience differently depending on the particular relevance or importance of that experience to the object of the specific blueprint 60, be it a job, career path, business division, etc. In this manner, each specific blueprint 60 is specific to and/or tailored to a given job, position, career path, business division, etc.

For example, according to the exemplary specific blueprint 60 illustrated in FIG. 4, experiences E1, E2, E5 and E8 have been designated low priority experiences; experiences E3, E6, E9, E12 and E15 have been designated medium priority experiences; and, experiences E4, E7, E10, E11, E13 and E14 have been designated high priority experiences. Assuming the example is for a given job or position within the enterprise, the specific blueprint 60 reflects the determination within the enterprise that for an individual to be best prepared, to flourish in or be best suited to the job or position it is of highest priority or importance that they have the experiences E4, E7, E10, E11, E13 and E14; it is a medium priority or relatively less important (but not least important) that they have the experiences E3, E6, E9, E12 and E15; and, it is of the lowest priority or least importance that they have the experiences E1, E2, E5 and E8. Similarly, assuming that the example is for a given career path within the enterprise, the specific blueprint 60 reflects the determination within the enterprise that for an individual to be best prepared for, to flourish in or be best suited to a particular career path or grade, band or organization level, it is of highest priority or importance that they have the experiences E4, E7, E10, E1, E13 and E14; it is a medium priority or relatively less important (but not least important) that they have the experiences E3, E6, E9, E12 and E15; and, it is of the lowest priority or least importance that they have the experiences E1, E2, E5 and E8.

To create and/or manage the various blueprints, the tool 16 optionally provides a mode or task whereby the overall blueprint 50 and/or specific blueprints 60 are selectively defined and/or edited. In this way, the tool 16 can be selectively customized for the enterprise employing it. For example, an authorized individual (such as a human resources or talent management professional or an external consultant) selectively initiates an overall blueprint design task or function, optionally, by using one of the workstations 10 to access the tool 16 from the server 12 over the network 14. Suitably, via the blueprint design and/or editing task, the user designates the number of rows and/or columns for the overall blueprint matrix, enters grade levels and/or experience titles within the matrix, drafts experience descriptions, selects the number of specific blueprints to create which are designated for particular positions, career paths or business divisions, and assigns the weights/priority to experiences in the specific blueprints. Optionally, after they are established, the overall and/or specific blueprints are stored in a suitable data storage device or location accessible by the tool 16, e.g., such as a database (DB) 17 or memory or the like.

In accordance with an exemplary embodiment of the tool 16, once the overall blueprint 50 and/or specific blueprints 60 have been created or otherwise established, they are selectively accessible by users for viewing on the workstations 10. Suitably, a user employs the workstation GUI to select a designated link (e.g., the "Overall Blueprint" link shown in the navigation pane of FIG. 2) or to select some other like object on another window or screen or from within a menu, and in response, the overall blueprint 50 is accessed from the tool 16 and sent by the server 14 over the network 12 to the accessing workstation 10 for display thereon. Optionally, separate links (e.g., the "Business Division Blueprint" link, the "Career Path Blueprint" link, and the "Job Blueprint" link shown in FIG. 2) or the like are similarly provided and or used to selectively access and/or display specific blueprints 60. Suitably, selection of aforementioned specific blueprint links or objects navigate the user to or otherwise present the user with an intermediate webpage or menu which lists the specific blueprints 60 within the category selected, then from there the user may select the particular specific blueprint 60 they wish to retrieve and/or display.

Once a blueprint is displayed on the workstation 10 or otherwise output, a user may selectively obtain a more detailed description of an experience included therein by selecting the particular experience of interest from the matrix using the workstation's GUI. Suitably, a detailed description of the experience is then provided, e.g., in a pop-up window or the like. Optionally, selection of the experience entails "clicking" on the experience's box or title with a mouse button or some other similar active input executed via the GUI, or alternately, the experience may be selected automatically merely by positioning a cursor or mouse pointer or the like over the experience's box or title.

When viewed or displayed, the various different priority levels assigned or attributed to a given experience in a specific blueprint 60 are graphically or otherwise represented so as to be readily recognizable and distinguishable from one another. For example, as illustrated in FIG. 4, different background intensities (i.e., darker or lighter) and/or different background colors are used within the blueprint's matrix to highlight and/or otherwise indicate the corresponding priority level for the respective experiences contained in the matrix. Optionally, as shown, an appropriate key or legend 62 is also displayed along with the specific blueprint 60.

Of course, optionally, one or more other graphical and/or non-graphical indicators of priority may be used in lieu of or in conjunction with the different intensities and/or different color backgrounds, e.g., different hatching or textured backgrounds may be used to distinguish one priority level from another; a numerical or other like label indicating the priority of an experience within the matrix may be listed or displayed along side, in the same box as or otherwise associated with each experience; the experience titles may be displayed using different fonts, different font sizes and/or different font characteristics (e.g., bold, underline, italic, etc.) to reflect different priority levels; etc. Suitably, however, the graphical representation scheme selected to identify the different priority levels and/or distinguish them from one another is chosen to direct or focus a user's attention more toward the higher priority experiences as compared to the lower priority experiences. Such a scheme is beneficial insomuch as by definition the higher priority experiences are of greater importance compared to the lower priority experiences. For example, it has been found that a scheme which uses relatively darker intensity backgrounds to denote higher priority experiences and relatively lighter intensity backgrounds to denote lower priority experiences generally draws or focuses a user's attention toward the higher priority experiences. Such a highlighting scheme intuitively communicates to a viewer the relative priorities of the different experiences.

Figure 5:
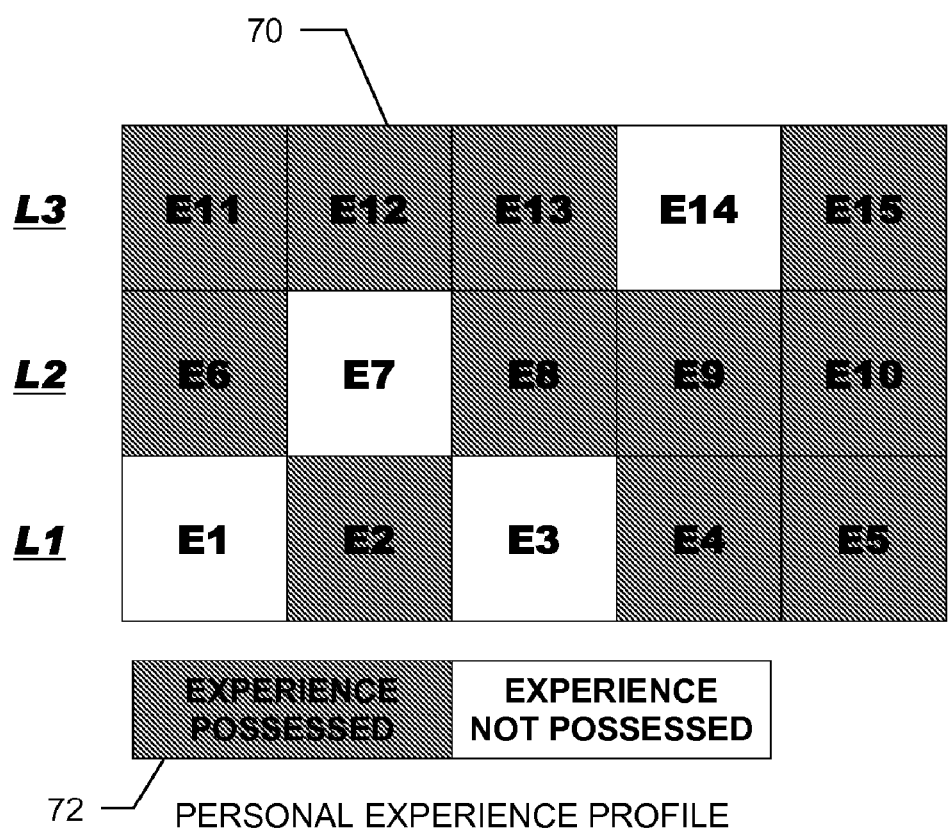
FIG. 5 is a graphical representation of an exemplary personal experience profile utilized by the tool of FIG. 1.

The overall blueprint 50 also serves as the basis for defining an individual's personal experience profile. FIG. 5 illustrates a graphical representation of an exemplary personal experience profile (PEP) 70 that is selectively created, updated and/or accessed via the tool 16. Suitably, the overall blueprint 50 is the template after which the PEP 70 is modeled, i.e., the PEP 70 has the same grade, band or organization levels and experiences in the same locations relative to one another as the overall blueprint 50. An individual's PEP 70 provides a graphical representation of which experiences the individual does or does not possess, i.e., out of those experiences contained in the overall blueprint 50.

Suitably, a user employs the workstation GUI to select a designated link (e.g., the "Create Personal Profile" link shown in the navigation pane of FIG. 2) or to select some other like object on another window or screen or from within a menu, and in response, a copy of the overall blueprint 50 is accessed from the tool 16 and sent by the server 14 over the network 12 to the accessing workstation 10 for display thereon. Alternately, if a PEP 70 has already been created or otherwise established for the individual, the user employs the workstation GUI to select a designated link (e.g., the "Update Personal Profile" link shown in the navigation pane of FIG. 2) or to select some other like object on another window or screen or from within a menu, and in response, the previously saved PEP 70 is accessed by the tool 16 from the DB 18 and sent by the server 14 over the network 12 to the accessing workstation 10 for display thereon. A copy of the overall blueprint 50 or the previously created PEP 70, as the case may be, is used to capture and/or update the individual's PEP 70. In addition, other data entry fields, information and/or like objects are optionally provided and/or displayed to capture, update and/or otherwise obtain other related information, e.g., the individual's name, career highlights, work address, office location, e-mail address, work telephone numbers, hiring date or length of time with the enterprise, grade level within the enterprise, current job or position, supervisor, employee ID, education level, business unit or division, etc.

Via the GUI and/or browser of the workstation 10, this additional information is selectively entered or changed by the user as desired, and returned to the server 14 and/or tool 16 over the network 12 for storage, e.g., along with the PEP 70 in the DB 18.

Suitably, when initially created, the PEP 70 is merely a blank copy of the overall blueprint 50, e.g., reflecting that no experiences are possessed by the individual. Changes to the PEP 70 are optionally made by the user via appropriate manipulation of the workstation's GUI and/or browser. For example, experience boxes and/or titles contained in the displayed matrix are selectively chosen to indicate that the individual does possess or does not possess that associated experience. Suitably, repeated selection of a given experience toggles it back and forth between the two states. Optionally, selection is performed by "clicking" a designated mouse button while the pointer or cursor is over the desired experience box or title, or by performing some other like or designated user input or input sequence. In accordance with the state of each experience or changes thereto, the PEP 70 is displayed and/or updated accordingly, i.e., the graphical representation displayed reflects which experiences are possessed and which are not, and the information, e.g., stored in the DB 18 is made to reflect the same. That is to say, when updates to the PEP 70 displayed on the workstation 10 are entered, this information or data is sent over the network 12 or otherwise retrieved by the server 14 and/or the tool 16 which in turn updates the individuals PEP 70 in the DB 18.

In an alternate embodiment, when creating or editing a PEP 70, selecting an experience from the matrix opens a pop-up window or the like from which a user may select or enter data indicating the state of the experience, i.e., possessed or not possessed. Suitably, upon selecting a "save" or other like option, the pop-up window is closed and the experience state is set as entered. Optionally, a text box or other like data entry field is also included in this pop-up window. This text box enables the user creating the PEP 70 to add text describing the actual experience they feel qualifies as the experience selected from the matrix. For example, if a user selects "yes" to "International Experience", they have the opportunity to add text describing their international experience. One advantage of this option is the creation of an evolving detailed resume of experiences. Moreover, adding text to describe the actual experiences tends to create a stronger sense of validation and confidence in self-reporting, because individuals are less inclined to overstate their experience if they have to document it in detail. The information is also optionally accessible to those granted authorization to view the PEP 70. Suitably, the information can be selectively output in a user-friendly report of all text under the experiences and attached to the graphic PEP 70.

As illustrated in FIG. 5, different background intensities (i.e., darker or lighter) and/or different background colors are used within the PEP 70 to highlight and/or otherwise indicate which experiences are possessed and which are not. Suitably, in the PEP 70 the presence of color or a darker intensity background is used to represent the fact that an experience is "possessed" and the absence of color or a white or lighter intensity background is used to represent the fact that experience is "not possessed." Such a scheme serves to highlight possessed experiences and intuitively communicates the relevant information underlying the graphical representation (i.e., the presence of color indicates a presence of the experience, while the absence of color indicates an absence of the experience). Of course, optionally, one or more other graphical and/or non-graphical indicators of the respective states may be used in lieu of or in conjunction with the different intensities and/or different color backgrounds, e.g., different hatching or textured backgrounds may be used to distinguish states from another; a numerical or other like label indicating the state of an experience within the matrix may be listed or displayed along side, in the same box as or otherwise associated with each experience; the experience titles may be displayed using different fonts, different font sizes and/or different font characteristics (e.g., bold, underline, italic, etc.) to reflect different states; etc. In any event, a key or legend 72 is also optionally displayed so that a user can readily recognize and/or interpret the current state of each experience in the PEP 70, i.e., "possessed" or "not possessed."

Figure 6:
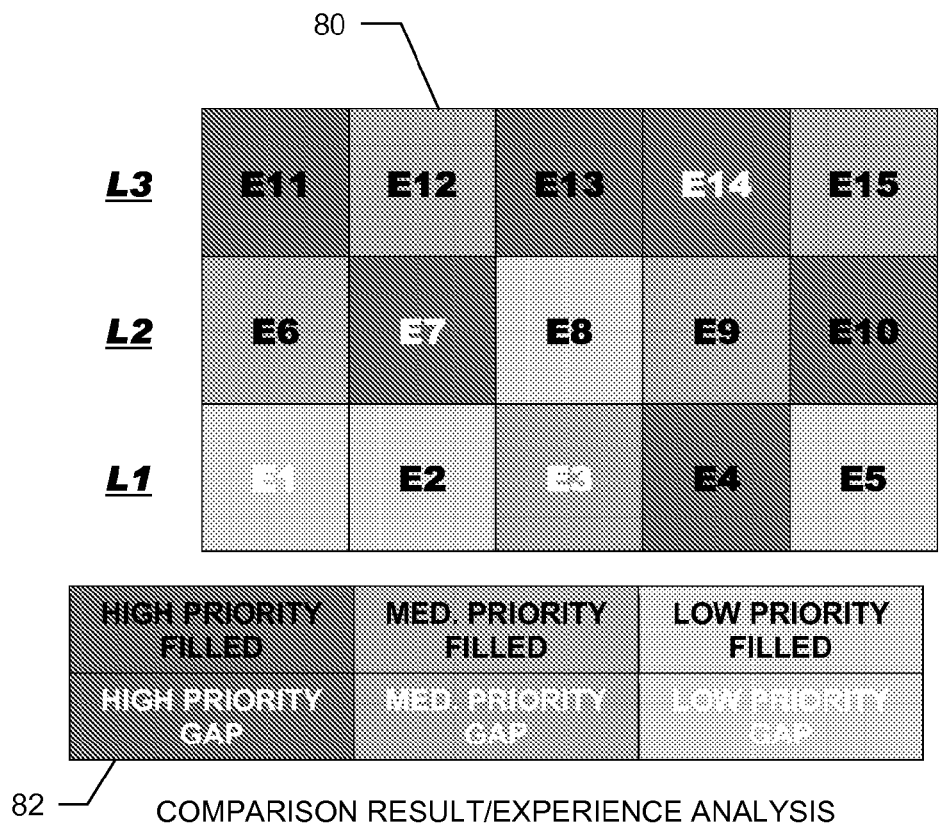
FIG. 6 is a graphical representation of an exemplary experience analysis output by the tool of FIG. 1.

In one suitable embodiment, the tool 16 is provisioned with a gap analysis feature (GAF). The GAF compares a selected PEP 70 with a selected specific blueprint, and outputs a resulting graphical representation that reflects the compatibility between the two. That is to say, the resulting graphical representation highlights or otherwise indicates how well the individual fits with the object of the specific blueprint, be it a job, position, career path, business division, etc. FIG. 6 shows an exemplary GAF output result 80, when the selected PEP 70 is the one shown in FIG. 5 and the selected specific blueprint 60 is the one shown in FIG. 4.

Suitably, the GAF is selected when a user employs the workstation GUI to select a designated link (e.g., the "Compare Profile to Blueprint" link shown in the navigation pane of FIG. 2) or to select some other like object on another window or screen or from within an appropriate menu. Suitably, in response to selecting the GAF, the user navigates to or is otherwise presented with an intermediate webpage or menu which lists the available specific blueprints 60 and PEPs 70 from which the user may select the particular PEP 70 and the specific blueprint 60 they wish to compare. Optionally, the selectable PEP 70 defaults and/or is restricted to the user's own individual PEP 70. The selections are in turn communicated to the server 14 and/or tool 16 over the network 12. Accordingly, the selected PEP 70 and the selected specific blueprint 60 (or the underlying data representing them both) are retrieved by the server 14 and/or the tool 16 (e.g., from the DB 18 or elsewhere). The retrieved matrices, information and/or data are then compared, and the result 80 is formatted or constructed by the tool 16 and/or the server 14 which returns the same over the network 12 to the workstation 10 for display thereon. Along with the GAF result 80, a key or legend 82 is also optionally displayed or output on the workstation 10 so that a user can readily recognize and/or interpret the result 80.

Suitably, the selected specific blueprint 60 serves as the template for the output result 80. That is to say, the matrix of the result 80 has the same grade, band or organization levels and experiences in the same locations relative to one another as the matrix of the specific blueprint 60, and the experiences in the matrix of the result 80 have the same priority levels as those in the specific blueprint 60. As shown in FIGS. 4 and 6, the result 80 also suitably employs the same priority highlighting scheme employed by the selected specific blueprint 60, thereby promoting consistency and an intuitive comprehension or understanding of the result 80 and/or its meaning.

The state of each experience (i.e., possessed or not possessed) is obtained or extracted from the selected PEP 70. When an experience is indicated as "filled" in the result 80 it denotes or reflects that the selected PEP 70 for the individual recorded that experience as being possessed, and when the result 80 indicates a "gap" in experience it denotes or reflects that the selected PEP 70 for the individual recorded that experience as not being possessed. As shown in FIG. 6, the result 80 and/or the corresponding matrix of experiences are displayed or otherwise output on the workstation 10 such that the respective states of the experiences are indicated, e.g., reflected in the titles contained in the matrix. While the states of the experiences may be graphically or non-graphically reflected, distinguished and/or identified in any of the manners previous described or otherwise suitable, it has been found to be advantageous to use the intensity and/or color of the titles to indicate the states of the experiences in the result 80 as being "filled" or having a "gap," particularly when a similar scheme is used in the background to distinguish and/or identify the experience priorities (i.e., as shown in FIGS. 4 and 6). Of course, the reverse is also similarly advantageous, i.e., where the title or font is used to reflected experience priority and the background is used to indicate the experience states.

Returning to the example illustrated in FIG. 6, suitably, for display purposes, a black or otherwise dark intensity and/or color title or font is used in the result 80 where the experience is possessed, and a white or otherwise light intensity and/or color title or font is used in the result 80 where the experience is not possessed. Such a scheme serves two purposes. First, the white or light titles evoke the impression of a gap in space which reinforces an observer's intuitive notion of the meaning since they in fact represent a gap in experience, while the black or dark titles evoke the impression of a filled space which also reinforces an observer's intuitive notion of the meaning since they in fact represent a filled experience. Second, by indicating an experience gap using an intensity and/or color title which is the opposite of or that sharply contrasts with the intensity and/or color background used to indicate higher priority experiences, gaps in high priority experiences are made to stand out in the displayed result 80 more than gaps in relatively lower priority experiences. For example, in FIG. 6, note how the gap in the high priority experience E14 is more readily observed and/or recognized as compared to the gap in the low priority experience E1. Accordingly, more important experience gaps are more prominently displayed in the result 80, while less important experience gaps are less prominently displayed in the result 80. Of course, the benefit of succinctly and intuitively conveying this information in the manner described can be appreciated even more when there is a relatively large number of experiences at issue.

Additionally, as shown in FIGS. 5 and 6, the result 80 also suitably employs a similar highlighting scheme in its titles or fonts as the highlighting scheme that is employed in the background of the PEP 70, thereby promoting consistency and an intuitive comprehension or understanding of the result 80 and/or its meaning. That is to say, for example, in those experiences where the PEP 70 has a dark background to indicate that an experience is possessed, then for the corresponding experience in the result 80 a dark title or font is used to indicate that the experience is "filled"; and, in those experiences where the PEP 70 has a light background to indicate that an experience is not possessed, then for the corresponding experience in the result 80 a light title or font is used to indicate that there is a "gap" in the experience.

Of course, it is to be appreciated that the blueprints, profiles, and/or GAF output results illustrated in the FIGURES are exemplary graphical representations of the underlying information contained therein. Suitably, these graphical representations are selected for display and/or output purposes so as to make the information readily comprehensible and/or meaningful to the users viewing the same. Optionally, the actual underlying data comprising this information is recorded or otherwise stored in any convenient and/or accessible (i.e., readable and/or writable) format, e.g., in the DB 18 or elsewhere. Accordingly, when requested by one of the workstations 10, the tool 16 and/or the server 14 accesses the appropriate underlying data and formats the data or otherwise constructs the graphical representations in accordance with the data to generate the blueprint, profile, and/or GAF result requested. Similarly, information or data indicated by a change to the graphical representation of a profile, blueprint or GAF result or selection of objects or links contained therein and/or displayed on the workstation 10, are optionally returned to the sever 14, the tool 16 and/or the DB 18 in like fashion, i.e., the data or information may optionally be returned in any convenient or desirable format that is recognized by the receiving entity or node.

Beyond the aforementioned, it is worthwhile to note that the blueprints, profiles and/or GAF results described herein promote and/or create visual representations that effectively and efficiently communicate relatively large amounts of highly relevant and/or meaningful information, thereby significantly contributing to and/or enhancing the effectiveness, efficiency and speed of various talent management processes. The advantage of such an approach is particularly significant when compared to the way traditional talent management processes have treated and/or handled experience, i.e., often in superficial ways and/or with anecdotal or incomplete information. For example, traditional hiring and/or job placement processes are often time consuming and burdensome, typically because they are commonly conducted via a manual review of text documents such as traditional resumes or personal development plans from numerous candidates. In contrast to the present approach which quickly and effectively communicates quantitative and qualitative experience information in a visual and intuitive graphical representation that is consistent and easily comparable, text documents such as resumes with their non-standard format, varying placement of information, differing degrees or amounts of content, etc. are simply not as efficient or effective at communicating experience information in an intuitively meaningful and/or readily comparable manner. Further, traditional hiring and/or job placement processes often suffer because it is frequently unclear what experiences an individual has actually had and what experiences are demanded by a specific job or position. In this way, the traditional hiring process is different from the present approach where it is clear what experiences an individual has had (including text describing their experiences), as well as what experiences are demanded by a specific job or position. Without this level of clarity (enhanced by both the 'individual' and the 'job' using the same experience blueprint or framework), it is often difficult to make an informed and successful hiring or selection decision.

Another feature tool 16 is optionally provisioned with is an experience based search feature. Using the workstation 10, a user manipulates the GUI and/or browser in any appropriate and/or designated manner to select the search feature, e.g., by "clicking" on or otherwise activating the "Development Search" link shown in the navigation pane of FIG. 2. In response, the tool 16 and/or the server 14 sends a search query webpage over the network 12 to the workstation 10 for display thereon. The user then enters their search query and returns the same. The tool 16 and/or server 14 in response to receiving the query, then accesses the DB 18 to extract the records and PEPs 70 that satisfy the query. The extracted records and/or PEPs 70 are then forwarded back to the requesting workstation 10. Optionally, a list of results satisfying the query is returned to requesting workstation 10 from which the user may select only those particular records and/or PEPs 70 they wish to retrieve and/or view in greater detail.

Optionally, the query page or other screen or window that is opened upon selection of the search feature includes one or more data entry fields into which the user may selectively enter search criteria to identify one or more individuals or candidates that meet the specified search criteria. For example, this search criteria may include, a geographic location or a particular business unit or division, a minimum and/or maximum education level, a minimum and/or maximum current grade level, band or organization level, a hiring date or a minimum and/or maximum length of time with the enterprise, a current job or position, etc.

Suitably, the search query page also displays a copy of the overall blueprint 50. For example, it is retrieved or otherwise obtained in the same manner as when a PEP 70 is first created, and similarly the experiences are selected in the same or a similar manner, e.g., toggled on and/or off. However, in this instance a PEP 70 is not being created or updated, rather an experienced based search query is being defined. Suitably, "double clicking" or otherwise selecting an experience box causes it to become highlighted (e.g., the box turns grey) signifying the experience has been added to the search criteria. During the search, the user's choices remain highlighted for reference and to facilitate an optional secondary search (e.g., a more refined search after an initial search). To remove an experience during a secondary search or if it was erroneously chosen, a user simply "double clicks" on or otherwise deselects any experiences they want removed from the search criteria and the highlighting is eliminated (e.g., the box returns to white), signifying that the experience is no longer included in the search criteria. Again, this scheme is intuitively consistent with the overall framework provided by the tool 16.

In addition to selecting which experiences are being sought and which are not, a user definable parameter is also optionally provided to limit the query results to only those records or PEPs in the DB 18 that include a minimum number of the selected experiences in the state desired or selected (i.e., presumably the "possessed" state). For example, in this "Development Search", if the user selected experiences E1 through E8 on the submitted query (e.g., by double clicking these experience boxes), and set the definable parameter to a minimum of 6, the results returned would include all those PEPs 70 or a list of the individuals having PEPs 70 that showed any 6 or more of the experiences E1 through E8 as being possessed. Suitably, the results are returned in ranked order based upon the number of matching experiences that are possessed. Accordingly, to continue with the prior example, the individuals with PEPs matching all 8 of the experiences would be listed first, followed by those matching 7 out of the 8, followed by those matching only the minimum 6 out of 8.

Suitably, other beneficial experienced based searching tasks are also provisioned in the tool 16 and they may be selected by a user and/or function in similar fashion to the "Development Search" task. For example, a "Talent Search" task is optionally provided that enables a user to search the DB 18 for individuals who have certain specified experiences (e.g., user may specify individuals having certain criteria, e.g., grade, business, education, etc. that also have all the selected experiences that are important to the user in considering candidates for a job). The search then generates a report or list of candidates who fulfill all the criteria and who have all the specified experiences, i.e., only candidates that are a perfect match for the search are included on the report or list. Optionally, if user does not find a sufficient number of candidates (or too many candidates), then the user is provided the opportunity to conduct one or more refined secondary searches by selecting more experiences (to narrow the search) or less experiences (to widen the search).

As with the "Development Search" task, the aforementioned "Talent Search" uses a copy of the overall blueprint 50 as a template to enable efficient and intuitive selection of experiences for the search criteria. Beyond this, using the overall blueprint 50 as a template in this fashion provides for continuity and reinforcement of the framework adopted by the enterprise and incorporated in the tool 16. It also provides a significantly more meaningful representation of search criteria options, e.g., as compared to a simple pull down menu with the names of experiences. That is to say, it facilitates the initiation and/or creation of a search by enabling the user to see the overall picture of experiences selected (and the level of those experiences) in one complete visual representation. Likewise, it also facilitates the subsequent refinement of searches by enabling the user to see the overall picture of experiences, while adding or removing experiences to refine the search criteria.

Optionally, another search task the tool 16 is provisioned with is a "Succession Search." This search task is somewhat different from the two previously described searches in that a selected specific job blueprint 60 serves as the basis for the search. When this search is executed, the DB 18 is queried to find the closest matching PEPs 70 and a report or list of candidates is generated and/or output. The object of the search is to find the best fit for the specific job blueprint 60 that the user selects, which may or may not be an exact match (unlike the aforementioned "Talent Search" which only returns exact matches).

Suitably, the "Succession Search" starts by a user selecting a desired specific job blueprint 60, for example, from a pull down menu or other list on a search query screen or window. Using the search query screen or window, the user also specifies or selects a maximum number of experience gaps acceptable in the search results. Optionally, the number of acceptable gaps specified is selected on a priority level-by-priority level basis or as a total number of gaps or as some combination thereof. For example, the selected search criteria may specify for any one or more of the following: no more than "x" number of low priority gaps; no more than "y" number of medium priority gaps; no more than "z" number of high priority gaps; and/or, no more than "t" number of total gaps. Of course, only exact fits will result if the user sets the maximum number of total allowable gaps to zero.

Submitting or otherwise executing the "Succession Search" prompts a query of the DB 18 to find all the individuals (through their PEPs 70) that fall within the search parameters. Essentially, the GAF of the tool 16 is used to compare the PEPs 70 within the DB 18 to the specific job blueprint 60 selected for the search, and the results of each GAF comparison are filtered in accordance with the selected search criteria specifying the maximum number of allowable experience gaps so that only those individuals having experience gaps within the parameters selected are included in the output search results. Suitably, the output report or list of search results is sorted from best fit (i.e., the least number of gaps) to worst fit (i.e., the most number of gaps but still within the search parameters). Optionally, when sorting the results, a weighted score is assigned to each individual to determine their rank within the list. Weighted scoring takes into account not only the number of gaps but the priority level of each gap. For example, higher priority gaps are optionally weighted relatively more than lower priority gaps, thereby relatively increasing the score more than a lower priority gap and resulting in a poorer rank. In this manner, when two individuals otherwise have the same total number of gaps, the one with comparatively more higher priority gaps will have the poorer rank. Similarly, an individual with relatively more total gaps may still have a better rank than a second individual with less total gaps provided the weighted total of the first individual's gaps are less than the weighted total of the second individual's gaps (e.g., because the first individual's gaps are on balance generally in relatively lower priority experiences whereas the second individual's gaps are on balance generally in relatively higher priority experiences).

As can be appreciated, the "Talent Search" and the "Succession Search" each serve useful but different purposes. In the latter case, the user start with a specific job blueprint 60 instead of specifying a number of desired experiences from a template of the overall blueprint 50 as in the former case; and, in the latter case search results yield individuals that may or may not be an exact match as opposed the former case which only yields exact matches. The tool 16 in this way provides flexibility to aid in various different kinds of talent management, succession planning and/or development processes. For example, a user can select the "Succession Search" to look for the closest matching candidates to a specific job blueprint 60, some who may be an exact match and some who have up to a specified number of gaps. In some cases, an organization may want an exactly matching candidate (i.e., a candidate best suited to position, albeit possibly with limited opportunities for further development); and in other cases, an organization may want a candidate who is still a strong match, but has some gaps that could provide development opportunities for the individual. In either case, the tool 16 enables organizations to make an informed judgment based on the experience and/or gaps an individual has and how those experiences and/or gaps compare to the specific blueprint 60 of the job or position.

While sometimes the objective is to find a candidate with an ideal fit against experiences deemed important for success in a job or position, other times the objective is development opportunity. That is, sometimes an organization may wish to develop someone by putting them into a job or position even though they have gaps in one or more higher priority experiences. By looking at an individuals PEP 70 and comparing it to a specific job blueprint 60, an organization can then decide how many experience gaps they have and what priority levels those gaps are at, and therefore, how big a risk is it to put this person into this job or position. The flexibility of the tool 16 enables an organization to make a perfect fit against experiences or an imperfect but close fit, allowing the opportunity for development. Previously, the issue for organizations has been that they have not had a way to gauge how big a stretch (and therefore risk) a particular job or position would be for an individual, as they did not have a clear and readily understandable view of: the experiences an individual has had; what higher priority experiences were required to achieve success in a particular job or position; or the match between these two (i.e., experience possessed and experience demanded). This has been an enormous issue and often results in negative consequences for an organization and the individual when an individual fails because the job or position was too big a stretch for them to have any viable or meaningful chance of success. Furthermore, information about experience gaps enables an organization to proactively plan and create a support infrastructure for an individual commencing a developmental job or position to increase the chances of success (e.g., member of the team assigned to coach new incumbent on issues where they do not have prior experience), providing significant benefit to the individual and organization.

Optionally, a "Succession Planning" function builds on the output of a particular "Succession Search." Suitably, using the workstation 10, a user manipulates the GUI and/or browser in any appropriate and/or designated manner to select the succession planning feature, e.g., by "clicking" on or otherwise activating the "Succession Planning" link shown in the navigation pane of FIG. 2 and selects a job or position (e.g., from a pull down menu or pop-up window) for which a succession plan is being sought. Ultimately, the succession planning function generates a chart that optionally provides one or more pieces of the following information: 1) a list of candidates that are deemed suitable for the specific job or position; 2) current information about the candidates (e.g., current grade, current job title or position, length of time in the current position, etc); 3) an indication of the strength of the fit or likelihood of succession (e.g., preferred candidate, possible candidate, emergency candidate, etc.); and 4) a timeline or time frame that shows when each candidate will become suitable for the position (typically, in one to five year time frames over a ten-year window).

Figure 7:
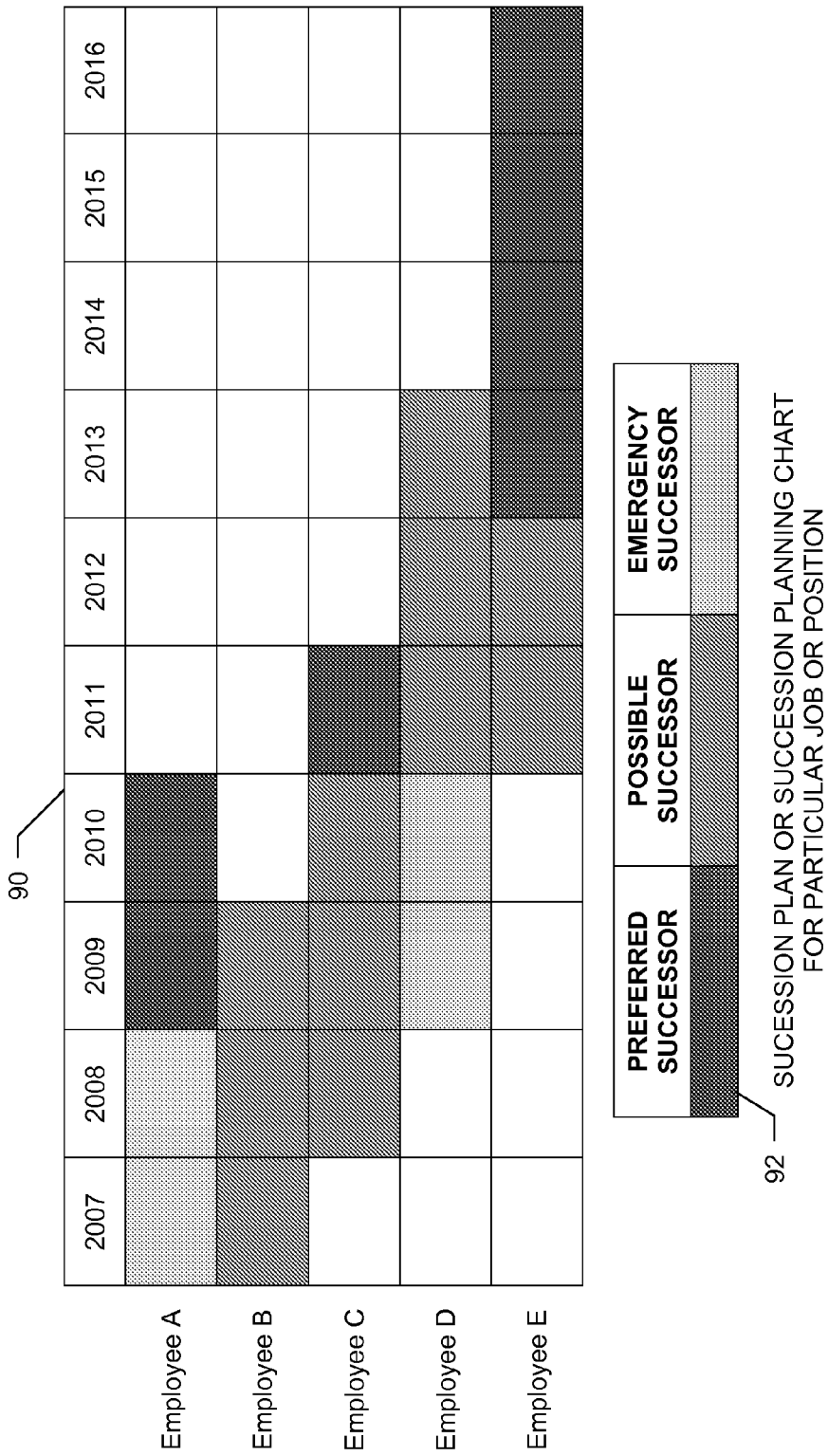
FIG. 7 is a graphical representation of an exemplary succession plan output by the tool of FIG. 1.

With reference to FIG. 7, an exemplary succession plan or succession planning chart is illustrated. The succession plan as shown includes a 2D matrix or chart 90 in which the rows represent particular individuals or employees (e.g., A-E) that appear in the succession plan and the columns represent a series of consecutive years or some other divisions of a given time frame. Suitably, as shown, the plan also includes the key 92. Per the illustrated key 92, there are three categories into which a potential successor may be designated, namely, preferred (i.e., the best fit for the position), potential (i.e., a suitable fit for the position) and emergency (i.e., the least desirable fit for the position but acceptable if circumstances warrant).

In practice, at any given time, typically one succession plan is generated per job or position. Regarding the aforementioned timeline, it is to be appreciated that some candidates will be considered suitable in the shorter term (e.g., in 0 to 3 years); some candidates may benefit from incremental development and accordingly thereafter would be viewed as suitable candidates in the mid-term (e.g., in 4 to 6 years); while more junior candidates in the organization or enterprise may benefit from even more development and accordingly thereafter would be viewed as suitable candidates in the longer-term (e.g., in 7 to 10 years). Accordingly, the chart 90 illustrates not only the strength of a particular candidates fit, but also the time frame at which they are likely to fall into one or more of the given categories.

Optionally, the succession planning process occurs in one of three ways: a manual process (starting with a blank document and adding all the information desired manually into the succession plan DB 20); an automated process; or some hybrid that starts with an automated draft and then is adjusted manually.

In operation, a user conducts a "Succession Search" to seek candidates for a target job or position or otherwise selects the succession planning function which prompts a succession search to be conducted. The output of this "Succession Search" generates a list of candidates who meet the specified criteria (e.g., less than maximum number of gaps; business division; highest level of education; and grade, band or organization level; amongst other criteria). Optionally, the user then reviews this list of candidates (e.g., clicking on name(s) to gain access to their PEPs 70 and/or conduct other experience analyses so as to achieve a suitably thorough review). Suitably, those candidates who are deemed most suitable for inclusion in a specific succession plan are selected by the user from the list. For each selected candidate, optionally a window would emerge where the user then specifies information for the succession chart, e.g., including: 1) the strength of the fit or likelihood of succession (e.g., preferred candidate, possible candidate or emergency candidate or some combination of categories over a specified timeframe); and 2) a time frame for each succession, that is, in specific years. Optionally, the tool 16 automatically generates the initial or a draft succession plan including all the individuals identified in the succession search results. Suitably, the tool 16 estimates strength of fit and/or the succession time frame for each individual, e.g., based upon the results of gap analysis (e.g., using the GAF) and/or other quantitative and/or qualitative evaluations and/or comparisons of each individual's PEP 70 and/or other information contained in the experience DB 18. For example, various factors are optionally weighed and/or taken into account by a succession planning algorithm implemented by the tool 16, such factors include, e.g.: (i) the underlying number and/or priority of gaps obtained by a gap analysis comparison of the individuals PEP to the specific job blueprint corresponding to the succession plan being created (an indication of readiness and/or strength of the candidate); (ii) the candidate's current grade as compared to the grade of the job for which the succession plan is being created (an indication of the appropriate timeframe for the candidate's succession); and, (iii) a candidate's time in their current grade (a shorter time in grade as compared a longer time in grade impacts one's readiness to succeed to a higher grade position). Optionally, a user may then alter the initial succession plan as they see fit, e.g., to account for intangible and/or other pertinent non-experience information they may possess about particular individuals that is not reflected or represented in their PEP 70. For example, if succession to a particular position means an individual has to relocate, and it is known that the individual is unwilling to relocate, then their name can be removed from the succession plan.

Suitably, a user is able to store these succession plans (e.g., in a succession plan DB 20 or other file or data storage location) and reference them thereafter, e.g., via a pull down menu (or a series of pull down menus broken down by grades or bands for efficiency). Optionally, a user is also able to edit, update and/or remove candidates from these succession plans as desired. A user is provided the opportunity to readily review succession candidates, e.g., by clicking on a name to gain access to that individual's PEP 70 and/or conduct further experience analyses with the tool 16.

In one suitable embodiment, a "Development Plan" is generated from the aforementioned succession plans. A particular Development Plan is optionally generated for anyone who appears in one or more succession plans stored in the succession plan DB 20. Typically, an enterprise using the tool 16 creates and maintains succession plans for their top jobs or positions (e.g., an organization may have succession plans on their top 100 jobs or positions). A particular individual within the enterprise may appear in any number of these succession plans, e.g., perhaps eight of the 100 succession plans. Therefore, rather than reviewing the 100 succession plans to identify all the succession plans that this individual appears in, it is significantly more efficient to generate a "Development Plan" for this individual. The "Development Plan" feature extracts information from succession plans for the specified individual and then amalgamates this succession planning information into a succinct and informative graphic display. Suitably, the "Development Plan" conveys possible development options for an individual over time, which is important when considering development next steps and longer term development (to ensure that one is maximizing their development and therefore, their ability to compete for jobs or positions longer term).

Figure 8:
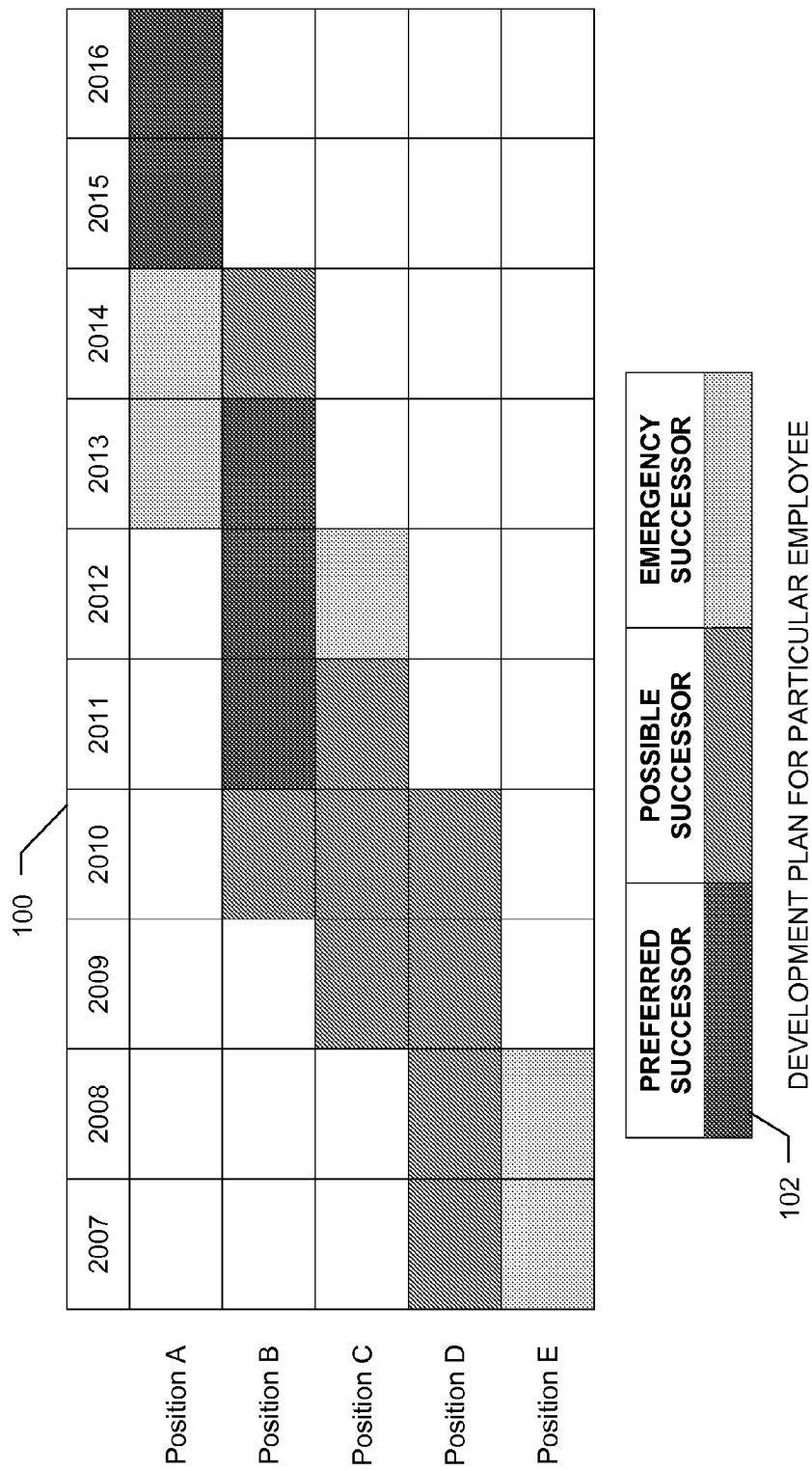
FIG. 8 is a graphical representation of an exemplary development plan output by the tool of FIG. 1.

With reference to FIG. 8, an exemplary development plan is illustrated for a particular individual. As shown, this individual appears in the succession plans for positions A-E. The 2D matrix or chart 100 depicts the succession information obtained from these succession plans (e.g., which are stored in the DB 20) for the individual for each of the positions, where positions are represented as rows in the chart 100. Suitably, the development plan also includes a key 102, which is optionally identical to the key 92. As with the succession plans, the development plan chart 100 has columns which represent consecutive years or other suitable divisions of a given time frame. In this manner, the development plan illustrates for a particular individual their suitably for particular positions over time.

In operation, suitably a user optionally goes to the "Development Planning" link and requests a development plan for an individual. For example, using the workstation 10, a user manipulates the GUI and/or browser in any appropriate and/or designated manner to select the development planning feature, e.g., by "clicking" on or otherwise activating the "Development Planning" link shown in the navigation pane of FIG. 2. A resulting pull-down menu or pop-up window or the like allows the user to select or enter the name of an individual for which the development plan is being created. The succession plans, e.g., stored in the DB 20, are searched for the name of the identified individual. If the individual does not appear on any succession plans, then the tool 16 indicates the same in a message output to the user, e.g., the message may state that no development plan is available for the individual in question or some other like message conveying the fact that the individual does not appear in any of the stored succession plans. If the individual does appear on one or more succession plans, then a development plan (e.g., such as the one illustrated in FIG. 8) will be generated and output by the tool 16. For each succession plan the individual appears in, a row is created in that individual's development plan. All relevant information on the individual is extracted from each succession plan to complete the development plan row corresponding to same position or job. The combination of rows in the development plan accordingly represents an amalgamation of the succession planning information pertaining to the individual at issue from all the succession plans in which the individual appears. Suitably, the tool 16 automatically ranks, sorts and/or otherwise manipulates the rows of information to produce an ordered and informative development plan in real time (i.e., in one suitable embodiment the development plans are not stored, rather they are generated in real time to reflect the most current information in the succession plans). Optionally, the tool 16 conducts a ranking or sorting algorithm or other like operation to determine the order in which generate rows of information are populated in the output development plan, i.e., the order of the positions list. Suitably, a number of factors are consider or taken into account when determining the order of the various rows in the development plan. For example, these factors may include, but are not limited to: the earliest time at which the individual is considered a candidate for the position; length of time the individual is seen as a viable candidate for the position; the grade of the position; and, the strength of succession (preferred, possible, etc.) for the position. More specifically, for example, the earlier in time that the individual is considered a candidate for a position then the lower the corresponding row appears in the development plan, while the further in time that an individual is considered a candidate for a position (and therefore, typically, the higher the grade of the position) then the higher the corresponding row appears in the development plan, etc. Optionally, any one or more of the factors are used to make the determination. For example, the order of rows is determined according to a rank for each row that is optionally determined using a weighted combination of the foregoing factors. Alternately, the rows are sorted and/or ordered in a first instance or on a first tier based upon a first factor, in a second instance or on a second tier based upon a second factor, and so on for each factor taken into consideration.

Optionally, a "Succession Management" function also builds on the output of the "Succession Search" and/or the "Succession Planning" function. In short, this is an amalgamation of a specified number or all succession planning charts, so that a user can analyze and identify key strengths and weaknesses of the overall succession planning talent pool.

Figure 9:
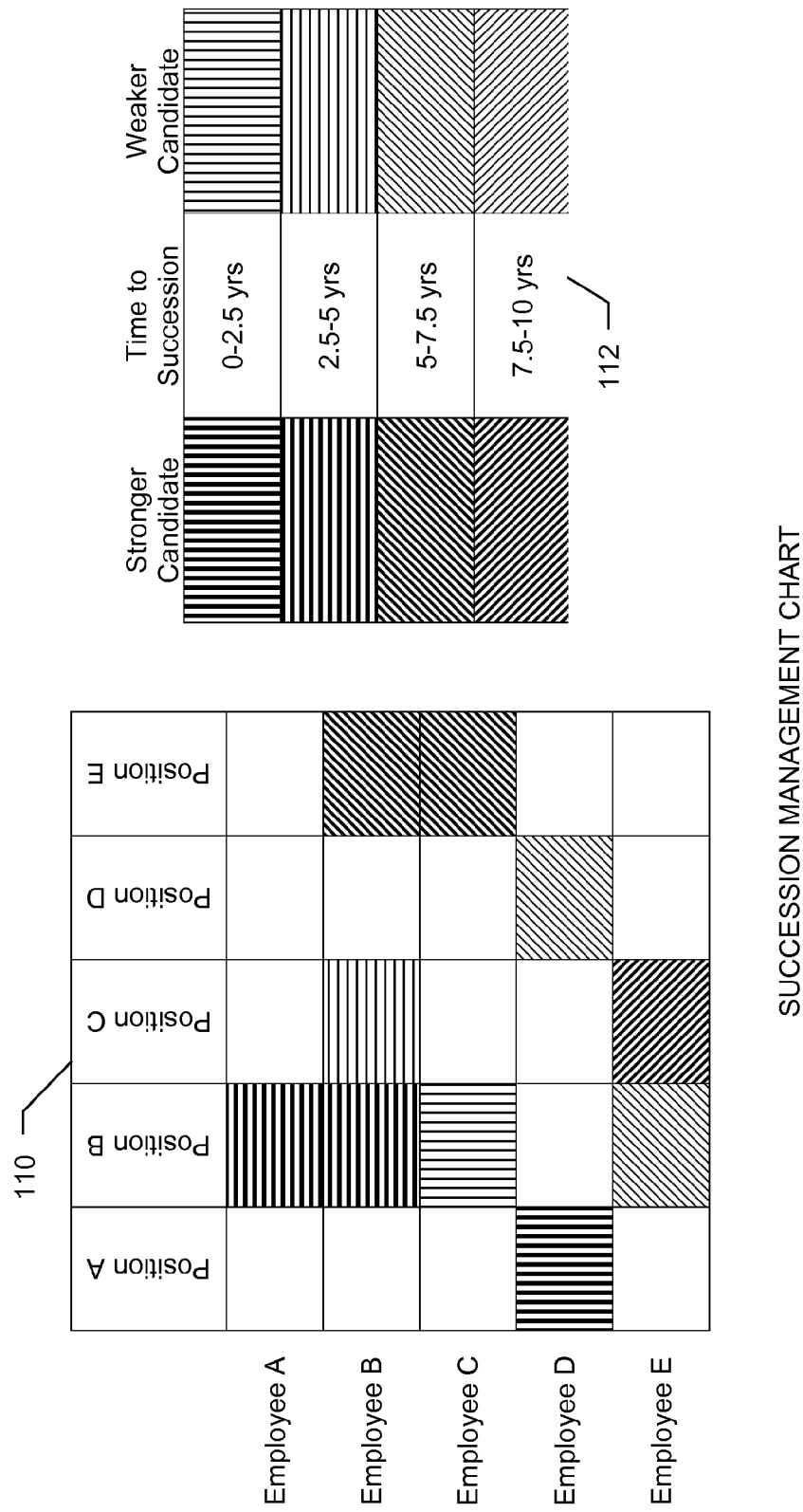
FIG. 9 is a graphical representation of an exemplary succession management chart output by the tool of FIG. 1.

With reference to FIG. 9, For example, a Succession Management chart 110 is generated that includes a list of people or individuals, e.g., on the Y-axis (i.e., rows); and, e.g., primarily senior level jobs or position on the X axis (i.e., columns). Optionally, if a person was not viewed as a candidate for a particular job or position they would receive a white box against this job or position (intuitively empty) and if a person was viewed as a candidate for a particular job or position they would receive a colored box against this job or position (intuitively full). The color coding key (e.g., key 112) optionally includes, e.g., eight categories: four colors for four time frames (over approximately ten years) with two levels of fit for each time frame (darker intensity of color for stronger candidates (intuitively consistent) and lighter intensity or pastel of the same color for weaker but reasonable candidates (again intuitively consistent). Suitably, the Succession Management chart amalgamates large numbers of individual succession planning charts into a succinct graphic display which efficiently conveys the pertinent information (where one column represents one succession plan in the overall succession management chart).

Suitably, a user is able to store these succession management charts (e.g., in a succession management DB 22 or other file or data storage location) and reference them thereafter. Optionally, a user is also able to edit, update and/or remove candidates from these succession management charts as desired. A user is provided the opportunity to readily review succession candidates, e.g., by clicking on a name to gain access to that individual's PEP 70 and/or conduct further experience analyses with the tool 16. Optionally, like the succession planning charts, the succession management charts are also initially generated automatically by the tool 16, and thereafter, the user is provided the opportunity to make desired adjustments as they see fit.

In operation, a user optionally goes to the "Succession Management" link and requests a particular succession management chart (that has been saved, e.g., in the DB 22) or generates a new succession management chart based on new information (e.g., updates to succession plans, or some selection of specific individuals and/or specific jobs or positions). For example, using the workstation 10, a user manipulates the GUI and/or browser in any appropriate and/or designated manner to select the succession management feature, e.g., by "clicking" on or otherwise activating the "Succession Management" link shown in the navigation pane of FIG. 2. The succession management process optionally occurs in one of three ways: a manual process (starting with a blank document and adding all the information desired manually into the succession management DB 22); an automated process; or some hybrid that starts with an automated draft and then is adjusted manually. In the automated process, the tool 16 takes into consideration a number of factors before generating the content of the succession management chart. These factors optionally include the same or similar factors as those taken into consideration for the generation of specific succession plans and/or development plans. The entries populating the succession management chart 110 are optionally based upon data extracted from the succession plans stored in the DB 20.

Suitably, upon selection of the succession management function, one or more pull-down menus and/or pop-up windows are presented to the user, whereby the user can select or enter the individuals and positions they wish to include in the succession management chart. Optionally, the individuals and/or positions can be individually selected or entire classes or groups thereof can be selected (e.g., all the individuals and/or all the positions within one or more particular grade levels or business units can be selected). This enables users to manipulate the data and produce a succinct graphic that is specific to the issue, question or interest at hand.

In one suitable embodiment, the tool 16 is also provisioned with one or more strategic planning functions. For example, one strategic planning function provides an experience specific filtered overview of an organization's collective talent pool. Suitably, using the workstation 10, a user manipulates the GUI and/or browser in any appropriate and/or designated manner to select the function, e.g., by "clicking" on or otherwise activating the "Experience Overview" link or object shown in the navigation pane of FIG. 2. In response, the tool 16 and/or the server 14 sends a search query webpage or screen over the network 12 to the workstation 10 for display thereon. The user then enters their search query and returns the same. The tool 16 in response to receiving the query, then accesses the DB 18 to extract the relevant data. Similar to the "Talent Search" and/or the "Development Search" tasks, the Experience Overview function also uses a copy of the overall blueprint 50 as a template to enable efficient and intuitive selection of experiences for use in connection with this particular function. However, rather than returning a list of discreet individuals matching search criteria, the tool 16 queries the DB 18 and calculates the number of records (i.e., individuals) in which the selected experiences are indicated as being possessed. That is to say, for example, if a user was to select E1, E4 and E5 in the template for the Experience Overview function, the returned results would indicate, out of all the personnel records in the DB 18, how many records individually list E1 as being possessed, how many records individually list E4 as being possessed, how many records individually list E5 as being possessed, and optionally how many records collectively list all of them (i.e., E1, E4 and E5) as being possessed. Beyond searching the entire DB 18 (as outlined above), this same Experience Overview can be executed on a specified subset of the DB 18. That is, the user could specific a business division; a grade, band or organization level; a range of grade, band or organization levels; and/or the highest level of education (amongst other search criteria) followed by the selection of specific experiences (as outlined above). The search would then yield results from a specified subset of the DB 18. Incrementally, multiple Experience Overview tasks (i.e., multiple cuts of the DB 18) are optionally executed as desired to reveal insightful pictures into the depth of talent within different parts of the organization.

The Experience Overview function provides added flexibility and power to the tool 16. This function is advantageous in a number of situations. For example, a shortfall of qualified individuals for a particular position may exist not only on the individual level, but on a more macro level such as a business division's talent pool or an organization's collective talent pool. The Experience Overview function of the tool 16 permits an enterprise to monitor such macro level shortfalls for strategic planning purposes and accordingly take appropriate countermeasures. An organization may, for example, have a growth strategy that includes an objective to enter a foreign market. However, to achieve success with that strategy they have determined their odds are greatly enhanced if they have 500 people who have experience working in the foreign culture and/or marketplace. Therefore, when customizing the tool 16 for the enterprise, an entry corresponding to this experience can be included in the overall blueprint 50. This enables an organization to get this experience on their development 'radar screen' (i.e., widely communicating the importance of this development experience now and in the future so that individuals, line managers, coaches, development committees and the overall organization may factor this into development planning). Using the tool's various experienced based search tasks and the Experience Overview function, an organization can then readily identify individuals that have this experience (i.e., on individual level) and/or monitor the number of people in the talent pool who have this experience (i.e., on the aggregate level or a subset of the aggregate level). This will enable an organization to understand the depth of their talent pool (in this particular experience area) and if they have shortfalls in the talent desired to meet their business strategy or goal (whether on the individual, subset of aggregate or the aggregate level). That is to say, overall the tool 16 enables an organization to determine if they have sufficient talent with the right experience and if not, it provides an early warning so that they can take measures to develop or recruit talent before a talent crisis emerges which impacts business performance and ultimately, the financial bottom-line.

Another optional function of the tool 16 provides users a convenient way to identify the priority distribution of all experiences across all job blueprints held in the DB 17, the priority distribution of one experience across all job blueprints held in the DB 17 and/or which jobs provide certain desired experiences at the desired level of priority (which facilitates the identification of suitable jobs to develop an experience gap, i.e., one would avoid jobs that prioritize this desired experience as high and seek jobs that prioritize this desired experience as medium, thereby providing development opportunity with lower risk of failure). Suitably, using the workstation 10, a user manipulates the GUI and/or browser in any appropriate and/or designated manner to select the function, e.g., by "clicking" on or otherwise activating the "Job Priorities Overview" link or object shown in the navigation pane of FIG. 2. In response, the tool 16 and/or the server 14 sends a webpage over the network 12 to the workstation 10 for display thereon. This webpage optionally includes a table that lists each experience from the overall blueprint 50, and associated with each experience in the table is the number and/or percentage of specific job blueprints 60 that include that experience at each of the different priority levels. For example, for experience E1, the table may show that there are "n" number of specific job blueprints that rate E1 as a high priority, that there are "m" number of specific job blueprints that rate E1 as a medium priority, and that there are "i" number of specific job blueprints that rate E1 as a low priority. Additionally, the table also optionally shows at which level or band the experience is within the overall blueprint 50. Optionally, by selecting an experience from the table, the user navigates to another page or pop-up window listing or reporting the particular jobs that rate the selected experience at different priority levels. Then by changing the priority level within a pull-down menu or otherwise selecting one or more desired priority level, only those jobs rating the selected experience at the selected priority level(s) are listed. From the job list, the user has the option of selecting a job to display the specific job blueprint 60 corresponding thereto. The "Job Priorities Overview" function is very advantageous feature for readily identifying those jobs that provide the right development opportunities for an individual and/or for readily identifying those jobs that play to ones strong suit or experiences.

In suitable embodiments of the tool 16, the colors select for the graphical representations of the various blueprints, GAF results, PEPs, highlighting schemes, etc. are color blind friendly. That is to say, in addition to achieving suitable contrasts where desired, color selections are made so as to minimize for the color blind population or users the loss of information communicated by the colors and/or the contrasts therebetween. As is known, color blind individuals in general have difficulty perceiving certain colors and/or distinguishing between certain colors. Accordingly, to supply color blind individuals the maximum benefit of the tool 16, color selections are optionally made from a color pallet tuned to minimize perception error and/or maximize color differentiation by color blind or similarly impaired users. For example, suitable color pallets and/or factors to consider for developing a color blind friendly color pallet are described in an article entitled "'The Eye of the Beholder'—Designing for Colour-Blind Users" by Christine Rigden, British Telecommunications Engineering (Volume 17, January 1999).

In suitable embodiments, the tool 16 is provisioned and/or one or more of the output results or graphic representations produced and/or utilized thereby (e.g., PEPs, overall blueprint, specific blueprints, GAF results, succession plans, development plans and succession management charts) are configured to support a variety of point-and-click functions. That is to say, by using the GUI to point-and-click or otherwise select a link or other object within a displayed graphic representation, a user can selectively navigate to and/or generate other supporting or associated graphic representations or display supporting or associated data upon which the given graphic representation is based or implement particular functions of the tool 16. For example, when viewing the results of a succession search or a succession plan, the names of the individuals appearing therein are optionally active links or objects that when selected invoke particular actions. The particular action, e.g., may be to call up the PEP of the individual, generate a development plan for the individual, perform a gap analysis for the individual with respect to the position or specific job blueprint upon which the succession search or plan was based, etc. In another example, when viewing a development plan, the positions or jobs listed therein are optionally active links or objects that when selected invoke particular actions, which may be, e.g., calling up the succession plan associated with the position or job selected or performing a gap analysis for the individual with respect to the selected position (i.e., comparing that individual's PEP against the specific job blueprint for that position). Likewise, the names of individuals and/or positions listed in the succession management chart may also be active links and/or objects that perform similarly when selected. Significantly, the embedded point-and-click functionality of the tool 16 allows a user to automatically perform further relevant experience analysis directly from a given graphical representation and/or obtain the more detailed or in-depth experience information and/or data that forms the basis for the given graphical representation.

As can be appreciated from the foregoing description, various features and/or aspects of the tool 16 provide real time analysis of current data. For example, the GAF, succession plan generation, development plan generation, succession management and the various searches all employ current data so as to provide real time results based on that data. Accordingly, for example, running the GAF at one point in time may yield a certain result based upon the current data in the applicable PEP at the time. However, the data in the PEP may change from time to time, and rerunning the GAF generates real time results reflecting those changes in the PEP, because each time the GAF is implemented a fresh comparison is made between the then current PEP and the specific blueprint of interest.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A computer implemented method of transforming a database collection of experience information from a plurality of users into an individual personal experience profile, said method comprising:
   (a) defining and storing an overall blueprint representing a collection of experiences in a two-dimensional matrix having a plurality of entries organized into a plurality of rows and columns such that each entry in the matrix corresponds to one experience in the collection;
   (b) defining and storing a plurality of specific blueprints each of the same layout and format as the overall blueprint such that each specific blueprint represents the collection of experiences in the two-dimensional matrix and indicates a relative priority of each experience in the collection for the particular specific blueprint;
   (c) defining a plurality of individual personal experience profiles generated from experience information obtained from a plurality of individuals using the overall blueprint, said experience information obtained for each individual defining the individual personal experience profile for that individual and indicating which experiences in the collection the individual possesses;
   (d) storing the individual personal experience profile for each individual in a computer operable database managed with a database management system, wherein, each stored individual personal experience profile including the obtained experience information defining the individual personal experience profile for that individual is stored independently of a relationship to any specific blueprint;

(e) comparing using a computer processor a selected specific blueprint with a plurality of individual personal experience profiles, in order to determine the individual personal experience profile that most closely matches a specific blueprint; and, (f) generating an output result based upon the comparison, said output result: (i) representing the collection of experiences in the two-dimensional matrix; (ii) indicating the relative priorities of the experiences in the collection in accordance with the selected specific blueprint; and, (iii) indicating which experiences in the collection are possessed by the individual to which the selected experience profile belongs.

2. The method of claim 1, wherein the relative priorities of the experiences are indicated in the output result by differing a background of the entries in the two-dimensional matrix.

3. The method of claim 2, wherein each entry in the matrix includes a title that identifies the experience to which the entry corresponds and in the output result the possessed experiences are distinguished from non-possessed experiences by differing an appearance of the entry titles in the matrix.

4. The method of claim 3, wherein relatively higher priorities are indicated with relatively darker intensity backgrounds and relatively lower priorities are indicated with relatively lighter intensity backgrounds.

5. The method of claim 4, wherein entries in the matrix corresponding to possessed experiences have titles which appear dark in intensity and entries in the matrix corresponding to non-possessed experiences have titles which appear light in intensity.

6. The method of claim 1, wherein each experience in the collection is most likely obtainable by an individual within an enterprise at one of a plurality of grade levels within the enterprise, said matrix being organized so that entries corresponding to experiences that are most likely obtainable at the same grade level appear in the same row.

7. The method of claim 1, further comprising:
(g) receiving input search criteria from a user;
(h) searching the experience information in the stored personal experience profiles in response to the input search criteria; and,
(i) providing a list of individuals having personal experience profiles that match the search criteria.

8. The method of claim 7, further comprising:
(j) retrieving the personal experience profile of an individual selected from the list.

9. The method of claim 7, wherein the search criteria is entered by the user via a copy of the overall blueprint, said user selecting entries in the copy of the overall blueprint to indicate which experiences are to be included in the search criteria.

10. The method of claim 1, wherein the generated output results are displayed on a computer operable display terminal on a computer workstation.

11. The method of claim 10, wherein the generated output is displayed using a graphical user interface.

12. The method of claim 1, further comprising a user adding text to an individual personal experience profile describing the experience they possess which relates to a specific experience in the overall blueprint.

13. The method of claim 1, wherein the output result comprised a new blueprint.

14. The method of claim 1, where the match between a selected specific blueprint and the plurality of individual personal experience profiles is evaluated by the number of experience matches.

15. A personnel development and talent management application system for obtaining a database collection of experience information from a plurality of users and transforming said database collection into an individual personal experience profile, the system comprising:

a stored overall blueprint representing a collection of experiences in a two-dimensional matrix having a plurality of entries organized into a plurality of rows and columns such that each entry in the matrix corresponds to one experience in the collection;

a plurality of stored specific blueprints each of the same layout and format as the overall blueprint such that each specific blueprint represents the collection of experiences in the two-dimensional matrix and indicates a relative priority of each experience in the collection for the particular specific blueprint;

a plurality of individual personal experience profiles populated with experience information entered for a plurality of individuals using the overall blueprint, said experience information obtained for each individual defining the individual personal experience profile for that individual and indicating which experiences in the collection the individual possesses;

a database for storing the individual personal experience profile for each individual, each stored personal experience profile including the obtained experience information defining the personal experience profile for that individual, wherein each stored personal experience profile is stored in the computer operable database managed with a database management system independently of a relationship to any specific blueprint;

a computer processor for receiving input search criteria from a user, searching the database in response to the input search criteria and finding the closest match in the database with the input criteria, and providing a list of individuals having personal experience profiles that match the search criteria; and means for retrieving the personal experience profile of an individual selected from the list.

16. The system of claim 15, further comprising:
a computer processor for comparing a selected specific blueprint with a plurality of individual personal experience profiles, in order to determine the individual personal experience profile that most closely matches a specific blueprint; and,
means for generating an output result based upon the comparison, said output result: (i) representing the collection of experiences in the two-dimensional matrix; (ii) indicating the relative priorities of the experiences in the collection in accordance with the selected specific blueprint; and, (iii) indicating which experiences in the collection are possessed by the individual to which the selected personal experience profile belongs.

17. The system of claim 16, wherein the output result is a new blueprint.

18. The system of claim 15, wherein the system is implemented on a computer network.

19. The system of claim 15, wherein the generated output is displayed on a computer operable display terminal on a computer workstation.

20. The method of claim 19, wherein the generated output is displayed through use of a graphical user interface.

21. The system of claim 15, where the closest match further comprises a correlation between required experiences in the job blueprint and possessed experiences as reported in a candidate's personal experience profile, where the correlation contains the fewest number of gaps between required experiences in the job blueprint and the experiences possessed by the candidate, the smallest gap between the job description's required job grade compared to the candidate's current job grade, and the longest candidate's total time in current job grade.

22. A computer implemented method of transforming a database collection of experience information from a plurality of users within an enterprise into a succession plan, said method comprising:
  (a) defining at least one job blueprint representing a collection of experiences in a two-dimensional matrix having a plurality of entries organized into a plurality of rows and columns such that each entry in the matrix corresponds to one experience in the collection, said at least one job blueprint corresponding to a particular position within the enterprise and indicating a relative priority of each experience in the collection for that position;
  (b) obtaining experience information for a plurality of individuals within the enterprise, said experience information obtained for each individual defining an individual personal experience profile for that individual and indicating which experiences in the collection the individual possesses;
  (c) comparing the personal experience profiles to one of the at least one job blueprint through use of a computer processor embedded in a computer server;
  (d) generating the succession plan based upon the comparison, wherein said succession plan includes a list of individuals having personal experience profiles that are the closest match with the job blueprint; and
  (e) storing the succession plan.

23. The method of claim 22, wherein for each individual listed therein, the succession plan indicates a relative suitability of the individual for the position to which the job blueprint corresponds at one or more particular intervals within a given time frame.

24. The method of claim 23, wherein the succession plan is represented by a two-dimensional table having along one axis thereof the list of individuals in the succession plan and along another axis thereof the particular intervals of the given time frame.

25. The method of claim 22, wherein a plurality of different job blueprints are defined in step (a) for a plurality of different positions within the enterprise, and steps (c) and (d) are performed with each of the plurality of different job blueprints to produce a plurality of succession plans for the plurality of positions within the enterprise.

26. The method of claim 25, further comprising:
  (f) storing the plurality of succession plans.

27. The method of claim 26, further comprising:
  (g) generating from the stored succession plans, a development plan for an individual that appears on one or more succession plans, wherein said development plan includes a list of positions corresponding to the succession plans in which the individual appears and indicates the relative suitability of the individual for the positions at the one or more particular intervals within the given time frame.

28. The method of claim 27, wherein the development plan is represented by a two-dimensional table having along one axis thereof the list of positions corresponding to the succession plans in which the individual appears and along another axis thereof the particular intervals of the given time frame.

29. The method of claim 28, wherein the development plan is color coded.

30. The method of claim 29, wherein the color coding of the development plan corresponds to the candidate being at least one of a preferred successor, a possible successor and an emergency successor.

31. The method of claim 24, wherein the development plan incorporates point and click technology.

32. The method of claim 28, wherein the development plan uses real-time development analysis.

33. The method of claim 25, further comprising:
  (h) generating from the store succession plans, a succession management chart, wherein said succession management chart indicates for a selected plurality of individuals within the enterprise a strength of fit for a selected plurality of positions within the enterprise; and
  (i) storing the succession management chart.

34. The method of claim 33, wherein the succession management chart is color coded.

35. The method of claim 34, wherein the color coding of the succession management chart corresponds to categories including different colors for different time frames with two levels of fit for each time frame including a first level having a darker intensity of color for stronger candidates and a second level having a lighter intensity of the same color for weaker but reasonable candidates.

36. The method of claim 33, wherein the succession management chart is represented by a two-dimensional table having along one axis thereof the selected plurality of individuals and along another axis thereof the selected plurality of positions within the enterprise.

37. The method of claim 36, wherein the succession management chart is an amalgamation of a plurality of succession plans, the succession management chart having cells displaying white indicating no fit or a color coding indicating a time to succession and strength of fit for succession.

38. The method of claim 33, wherein the succession management chart further indicates an amount of time until an individual appearing in the succession management chart becomes a candidate for a position listed in the succession management chart.

39. The method of claim 38, wherein the succession management chart incorporates point and click technology.

40. The method of claim 39, wherein the succession management chart uses real-time development analysis.

41. The method of claim 38, further comprising a user selecting or entering the individuals and positions the user wants to include in the succession management chart.

42. The method of claim 41, further comprising a user selecting at least one of the individuals and the positions within at least one of the particular grade levels and the business units the user wants to include in the succession management chart.

43. The method of claim 22, wherein the succession plan is displayed using a computer operable terminal containing a graphical user interface.

44. The method of claim 22, where the closest match further comprises a correlation between the required experiences in the job blueprint and the candidate's experiences in a candidate's personal experience profile, where the correlation contains the fewest number of gaps between required experiences in the job blueprint and the experiences possessed by the candidate, the smallest gap between the job description's required job grade compared to the candidate's current job grade, and the longest candidate's total time in current job grade.

45. The method of claim 22, wherein the succession plan comprises at least one of a plurality of years and other time frame divisions.

46. The method of claim 22, wherein the successors are identified as a preferred successor, a possible successor, and an emergency successor.

47. The method of claim 22, wherein the successors are internal employees of an organization.

48. The method of claim 22, wherein the succession plan is stored in a computer operable database.

49. The system of claim 22, wherein the succession plan is color coded.

50. The method of claim 49, wherein the color coding of the succession plan corresponds to the candidate being at least one of a preferred successor, a possible successor and an emergency successor.

51. The method of claim 22, wherein the succession plan incorporates point and click technology.

52. The method of claim 22, wherein the succession plan uses real-time development analysis.

* * * * *